United States Patent
Runnacles et al.

(10) Patent No.: US 12,434,225 B2
(45) Date of Patent: Oct. 7, 2025

(54) CATALYST AND A PROCESS FOR THE PRODUCTION OF ETHYLENICALLY UNSATURATED CARBOXYLIC ACIDS OR ESTERS

(71) Applicant: Mitsubishi Chemical UK Limited, Billingham (GB)

(72) Inventors: Jonathan Runnacles, Redcar (GB); David William Johnson, Redcar (GB); Toshio Hasegawa, Hiroshima (JP); Kazufumi Nishida, Hiroshima (JP); Wataru Ninomiya, Hiroshima (JP)

(73) Assignee: MITSUBISHI CHEMICAL UK LIMITED, Billingham (GB)

( * ) Notice: Subject to any disclaimer, the term of this patent is extended or adjusted under 35 U.S.C. 154(b) by 624 days.

(21) Appl. No.: 17/630,014

(22) PCT Filed: Jul. 24, 2020

(86) PCT No.: PCT/GB2020/051793
§ 371 (c)(1),
(2) Date: Jan. 25, 2022

(87) PCT Pub. No.: WO2021/019224
PCT Pub. Date: Feb. 4, 2021

(65) Prior Publication Data
US 2022/0250035 A1    Aug. 11, 2022

(30) Foreign Application Priority Data
Jul. 26, 2019 (GB) .................................. 1910754

(51) Int. Cl.
*B01J 21/06* (2006.01)
*B01J 21/08* (2006.01)
(Continued)

(52) U.S. Cl.
CPC ............. *B01J 23/04* (2013.01); *B01J 21/066* (2013.01); *B01J 21/08* (2013.01); *B01J 35/613* (2024.01);
(Continued)

(58) Field of Classification Search
CPC ........ B01J 21/063; B01J 21/066; B01J 21/08; B01J 21/10; B01J 35/613; B01J 35/615;
(Continued)

(56) References Cited

U.S. PATENT DOCUMENTS

| 4,308,172 A | 12/1981 | McDaniel |
| 5,069,816 A * | 12/1991 | DeSantis .................. C08K 3/34 |
| | | 516/111 |

(Continued)

FOREIGN PATENT DOCUMENTS

| CN | 101795967 A | 8/2010 |
| CN | 102126949 A | 7/2011 |

(Continued)

OTHER PUBLICATIONS

International Search Report and Written Opinion issued in PCT Application No. PCT/GB2020/051793; Mailing Date: Nov. 9, 2020.

(Continued)

*Primary Examiner* — Cam N. Nguyen
(74) *Attorney, Agent, or Firm* — Chrisman Gallo Tochtrop LLC

(57) ABSTRACT

The invention discloses a catalyst comprising a silica support, a modifier metal and a catalytic alkali metal. The silica support has a multimodal pore size distribution comprising a mesoporous pore size distribution having an average pore size in the range 2 to 50 nm and a pore volume of said mesopores of at least 0.1 cm$^3$/g, and a macroporous pore size distribution having an average pore size of more than 50 nm and a pore volume of said macropores of at least 0.1 cm$^3$/g.

(Continued)

Macropore Distribution of Silica Supports: Results of Mercury Porosimetry for Examples 1 to 4.

The level of catalytic alkali metal on the silica support is at least 2 mol %. The modifier metal is selected from Mg, B, Al, Ti, Zr and Hf. The invention also discloses a method of producing the catalyst, a method of producing an ethylenically unsaturated carboxylic acid or ester in the presence of the catalyst, and a process for preparing an ethylenically unsaturated acid or ester in the presence of the catalyst.

20 Claims, 4 Drawing Sheets

(51) Int. Cl.
| | |
|---|---|
| *B01J 21/10* | (2006.01) |
| *B01J 21/14* | (2006.01) |
| *B01J 23/04* | (2006.01) |
| *B01J 35/61* | (2024.01) |
| *B01J 35/63* | (2024.01) |
| *B01J 35/64* | (2024.01) |
| *B01J 35/66* | (2024.01) |
| *B01J 35/69* | (2024.01) |
| *C07C 51/353* | (2006.01) |
| *C07C 67/343* | (2006.01) |

(52) U.S. Cl.
CPC ........... *B01J 35/615* (2024.01); *B01J 35/617* (2024.01); *B01J 35/633* (2024.01); *B01J 35/647* (2024.01); *B01J 35/651* (2024.01); *B01J 35/69* (2024.01); *C07C 51/353* (2013.01); *C07C 67/343* (2013.01)

(58) Field of Classification Search
CPC ........ B01J 35/617; B01J 35/633; B01J 35/69; B01J 35/647; B01J 35/651; B01J 35/66; C07C 51/353; C07C 67/343
USPC .................................................. 502/258–262
See application file for complete search history.

(56) References Cited

U.S. PATENT DOCUMENTS

| | | | |
|---|---|---|---|
| 5,137,855 A | 8/1992 | Hegedus | |
| 5,583,085 A | 12/1996 | Ward | |
| 6,733,657 B2* | 5/2004 | Benazzi | B01J 35/635 |
| | | | 502/262 |
| 9,956,553 B2* | 5/2018 | Timken | B01J 38/10 |
| 10,022,702 B2 | 7/2018 | Bazer-Bachi | |
| 10,792,644 B2* | 10/2020 | Cadran | B01J 35/647 |
| 10,975,000 B2* | 4/2021 | Cadran | B01J 35/647 |
| 11,000,839 B2* | 5/2021 | Timken | B01J 35/638 |
| 2004/0030214 A1 | 2/2004 | Schindler et al. | |
| 2011/0039102 A1 | 2/2011 | Chaumonnot et al. | |

FOREIGN PATENT DOCUMENTS

| | | |
|---|---|---|
| CN | 102126969 A | 7/2011 |
| RU | 2011135743 A | 3/2013 |
| RU | 2567239 C2 | 11/2015 |
| RU | 2660419 C2 | 7/2018 |
| TW | 200831184 A | 8/2008 |
| TW | 201509523 A | 3/2015 |
| WO | 9952628 A1 | 10/1999 |
| WO | 03026795 A1 | 4/2003 |
| WO | 2009003722 A1 | 1/2009 |
| WO | 2019053438 A1 | 3/2019 |

OTHER PUBLICATIONS

Examination Report issued in corresponding Taiwan Patent Application No. 109125198; Dated: Apr. 11, 2024.
Combined Search and Examination Report issued in corresponding Application No. GB1910754.9; Mailing Date: Jan. 13, 2020.
English translation of a Search Report issued in corresponding Russian Patent Application No. 2022104567; Dated: Oct. 19, 2023.
English translation of an Office Action issued in corresponding Russian Patent Application No. 2022104567; Dated: Oct. 19, 2023.
Yang, et al., Hierarchically porous materials; synthesis strategies and structure design; Chem. Soc. Rev., 2017, No. 46, pp. 481-558.
Manayil, et al., Impact of Macroporosity on Catalytic Upgrading of Fast Pyrolysis Bio-Oil by Esterification over Silica Sulfonic Acids; ChemSusChem 2017, No. 10, pp. 3506-3511.
Bosman, et al., Characterization of the Acid Strength of SIO(2)-ZRO(2) Mixed Oxides; Journal of Catalysis, 1994, No. 148, pp. 660-672.
Takahashi, et al., Effects of aging and solvent exchange on pore structure of silica gels with interconnected macropores; Journal of Non-Crystalline Solids, 1995, vol. 189, pp. 66-76.
Haber, et al., Manual of Methods and Procedures for Catalyst Characterization; Pure & Appl. Chem., 1995, vol. 67, Nos. 8/9; pp. 1257-1305.
Fan, et al., Multiphased assembly of nanoporous silica particles; Journal of Non-Crystalline Solids, 2001, vol. 285, pp. 71-78.
Ma; et al., Ordered Nanoporous Silica with Periodic 30-60 nm Pores as an Effective Support for Gold Nanoparticle Catalysts with Enhanced Lifetime; J. Am. Chem. Soc. 2010, vol. 132, pp. 9596-9597.
Galarneau, et al., Synthesis and Textural Characterization of Mesoporous and Meso/Macroporous Silica Monoliths Obtained by Spinodal Decomposition; Inorganics, 2016, vol. 4, No. 9.
Cheng, et al., Synthesis of three-dimensionally ordered macroporous silica spheres by evaporation-induced assembling template process; Materials Letters, 2013, vol. 109, pp. 257-260.

* cited by examiner

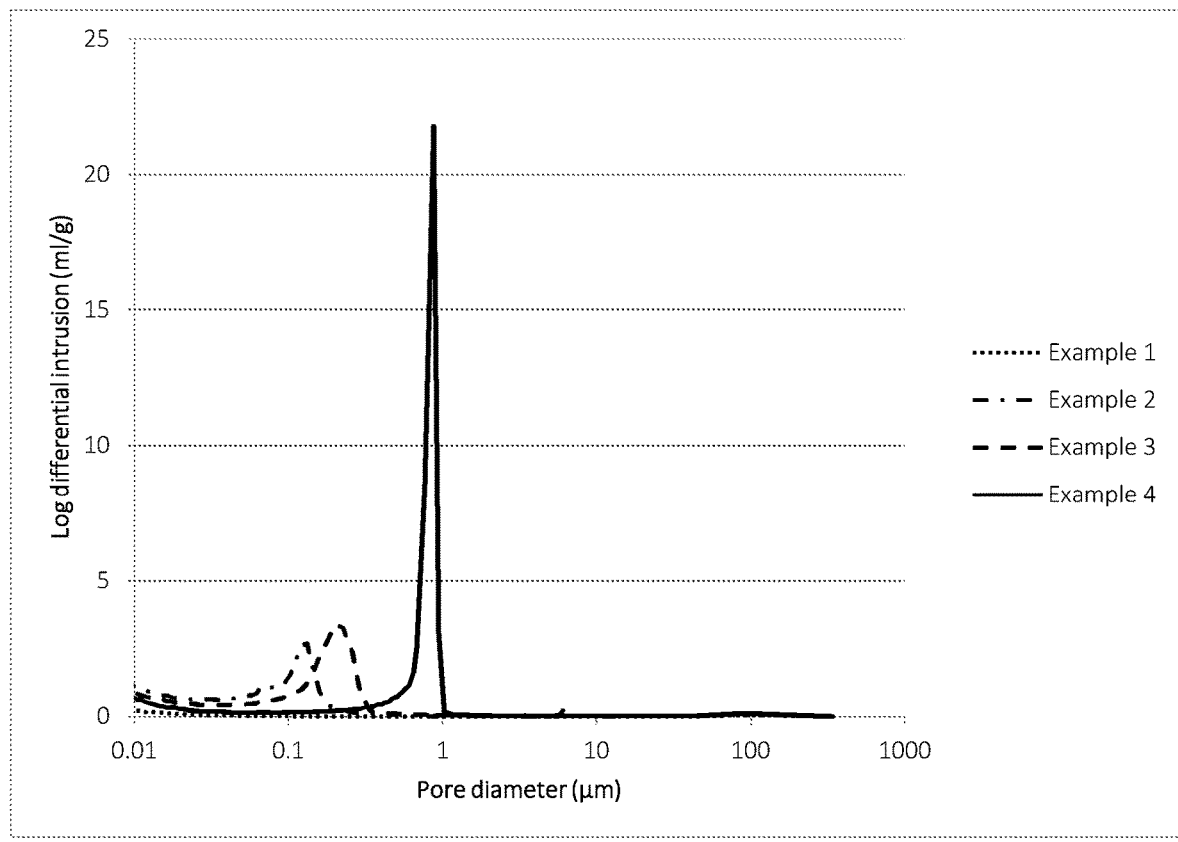
Figure 1: Macropore Distribution of Silica Supports: Results of Mercury Porosimetry for Examples 1 to 4.

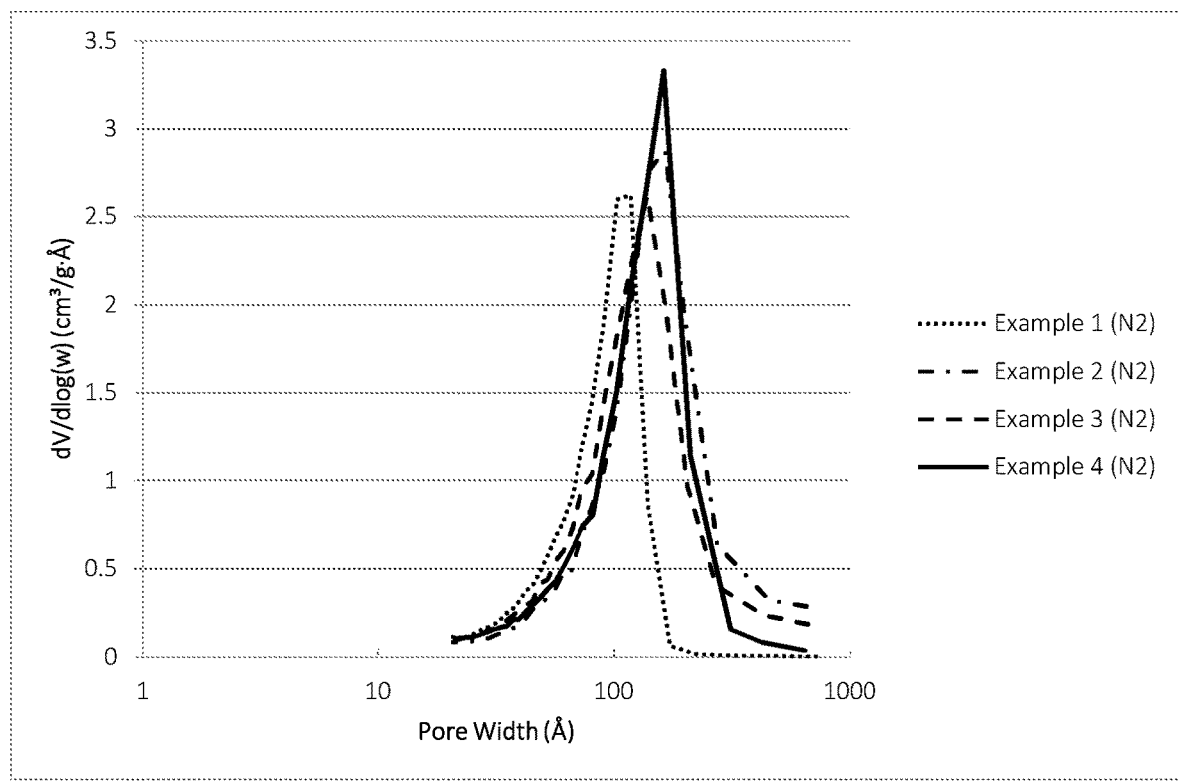
Figure 2: Mesopore Distribution of Silica Supports: Results of $N_2$ Adsorption for Examples 1 to 4.

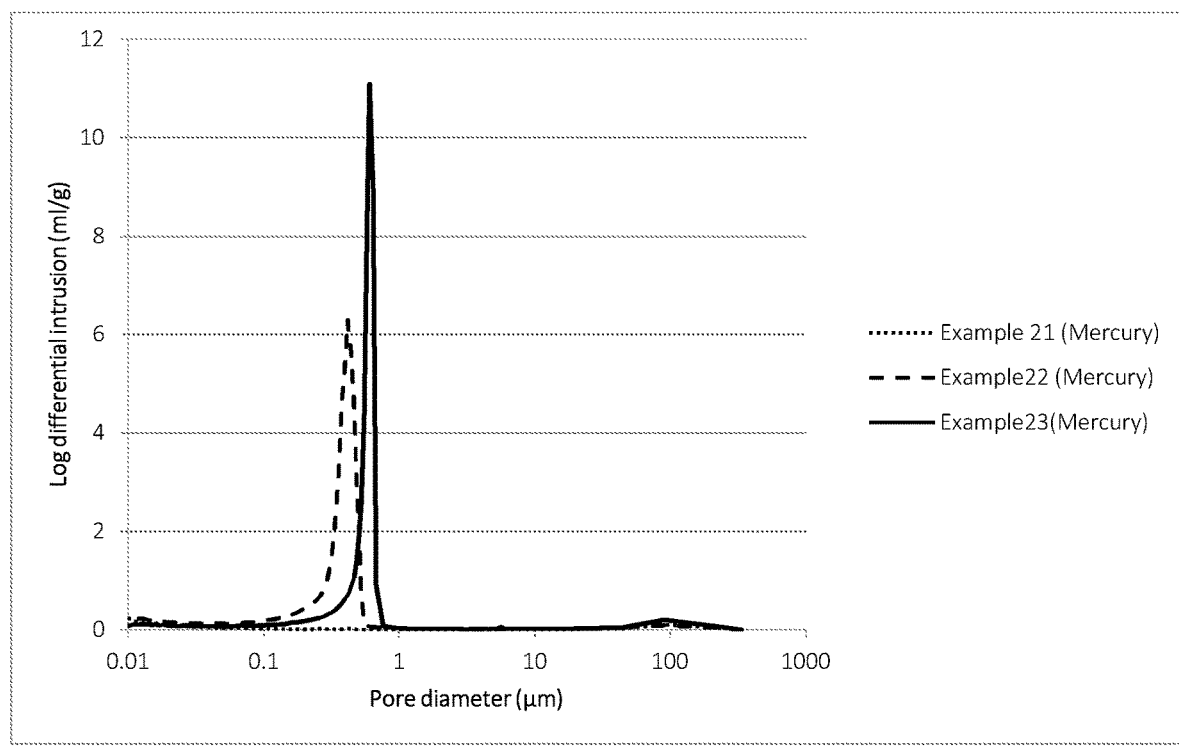
Figure 3: Macropore Distribution of Silica-Zirconia Supports - Results of Mercury Porosimetry for Examples 21 to 23.

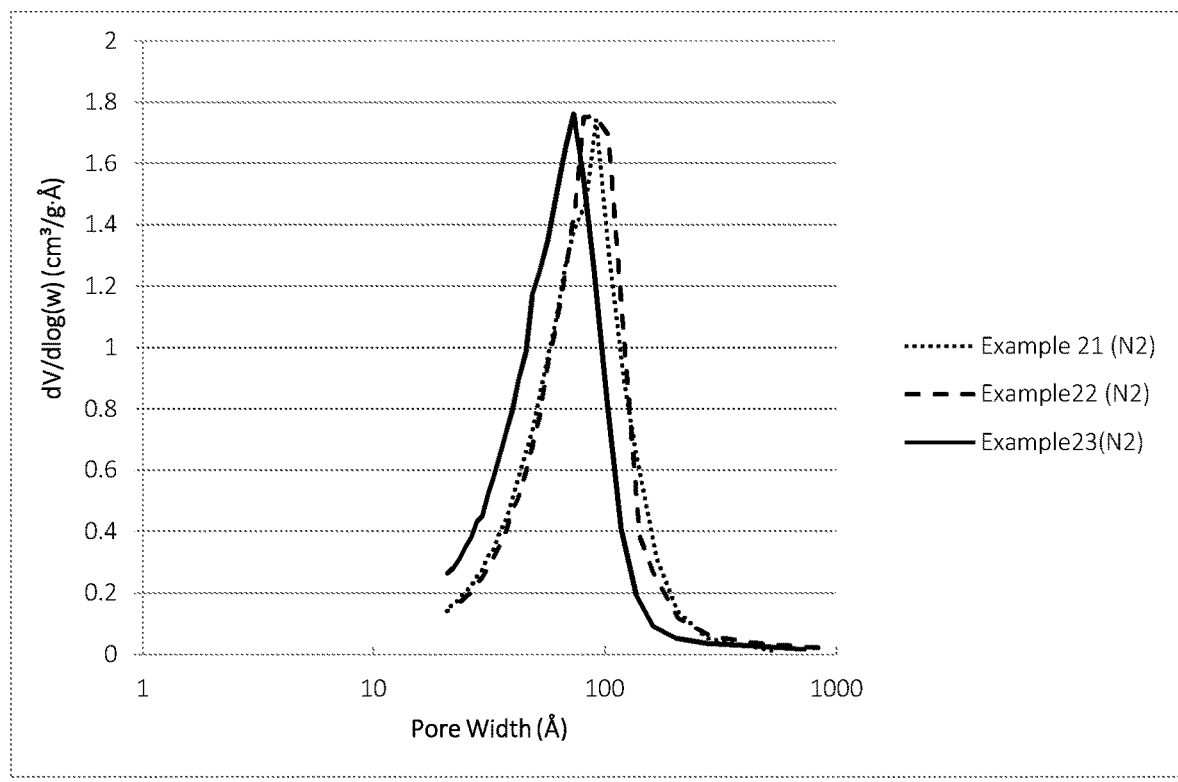
Figure 4: Mesopore Distribution of Silica-Zirconia Supports - Results of $N_2$ Adsorption for Examples 21 to 23.

CATALYST AND A PROCESS FOR THE PRODUCTION OF ETHYLENICALLY UNSATURATED CARBOXYLIC ACIDS OR ESTERS

The present invention relates to a multimodal silica catalyst and a process for the production of ethylenically unsaturated carboxylic acids or esters, particularly α, β unsaturated carboxylic acids or esters, more particularly acrylic acids or esters such as (alk)acrylic acids or alkyl (alk)acrylates especially (meth)acrylic acids or alkyl (meth)acrylates such as methacrylic acid (MAA) and methyl methacrylate (MMA) by the condensation of carboxylic acid or esters with formaldehyde or a source thereof such as dimethoxymethane in the presence of such catalysts, in particular, by the condensation of propionic acid or alkyl esters thereof such as methyl propionate with formaldehyde or a source thereof in the presence of such catalysts. The invention is therefore particularly relevant to the production of MAA and MMA. The catalysts of the present invention incorporate a multimodal silica support modified by a particular modifier metal and a catalytic metal.

As mentioned above, the unsaturated acids or esters may be made by the reaction of a carboxylic acid or ester and suitable carboxylic acids or esters are alkanoic acids (or esters) of the formula $R^3$—$CH_2$—$COOR^4$, where $R^3$ and $R^4$ are each, independently, a suitable substituent known in the art of acrylic compounds such as hydrogen or an alkyl group, especially a lower alkyl group containing, for example, 1-4 carbon atoms. Thus, for instance, MAA or alkyl esters thereof, especially MMA, may be made by the catalytic reaction of propionic acid, or the corresponding alkyl ester, e.g. methyl propionate, with formaldehyde as a methylene source in accordance with the reaction sequence 1.

and

Sequence 1

An example of reaction sequence 1 is reaction sequence 2

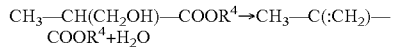

Sequence 2

The above reaction sequences are typically effected at an elevated temperature, usually in the range 250-400° C., using an acid/base catalyst. Where the desired product is an ester, the reaction is typically effected in the presence of the relevant alcohol in order to minimise the formation of the corresponding acid through hydrolysis of the ester. Also, for convenience it is often desirable to introduce the formaldehyde in the form of a complex of formaldehyde with methanol. Hence, for the production of MMA, the reaction mixture fed to the catalyst will generally consist of methyl propionate (MEP), methanol, formaldehyde and water.

A known production method for MMA is the catalytic conversion of MEP to MMA using formaldehyde. A known catalyst for this is a caesium catalyst incorporating a support, for instance, silica.

WO1999/52628 discloses a catalyst for use in the production of α, β unsaturated carboxylic acids or esters by the condensation of propionic acid or the corresponding alkyl ester wherein the catalyst comprises alkali metal doped silica impregnated with at least one modifier element wherein the modifier element is selected from a group consisting of boron, aluminium, magnesium, zirconium and hafnium, preferably zirconium and/or aluminium and/or boron and the alkali metal is selected from potassium, rubidium or caesium, preferably caesium.

WO2003/026795 discloses a catalyst for use in aldol condensations including the production of α, β unsaturated carboxylic acids by the condensation of propionic acid or propionic ester, olefin polymerisation, dehydration, hydroxylation and isomerisation wherein the catalyst comprises a silica-metal hydrogel impregnated with a catalytic metal wherein the metal of the hydrogel is selected from a group consisting of zirconium, titanium, aluminium and iron, preferably zirconium, and the catalytic metal is selected from a group consisting of alkali metals and alkaline earth metals, preferably caesium.

No teaching is provided in any of these documents of a multimodal silica support.

The present inventors have now discovered that a catalyst comprising certain multimodal silica supports, and containing a catalytic alkali metal, provides a high level of selectivity in the condensation of methylene sources such as formaldehyde with carboxylic acids or alkyl esters such as methyl propionate, and furthermore, low formation of heavies (lower relative volatility hydrocarbon by-products). The inventors have also found that the catalysts comprising the silica supports provide a high level of selectivity, even at higher loadings of catalytic metal.

Therefore, catalysts comprising such silica supports and containing a catalytic metal are remarkably effective catalysts for the production of α, β ethylenically unsaturated carboxylic acids or esters by condensation of the corresponding acid or ester with a methylene source such as formaldehyde providing several advantages such as high levels of selectivity and/or low formation of heavies.

According to a first aspect of the present invention, there is provided a catalyst comprising
  a silica support, a modifier metal and a catalytic alkali metal, preferably caesium,
  wherein the silica support has a multimodal pore size distribution comprising
  a) a mesoporous pore size distribution having an average pore size in the range 2 to 50 nm and a pore volume of said mesopores of at least 0.1 cm$^3$/g; and
  b) a macroporous pore size distribution having an average pore size of more than 50 nm and a pore volume of said macropores of at least 0.1 cm$^3$/g,
  wherein the level of catalytic alkali metal on the silica support is at least 2 mol %,
  and wherein the modifier metal is selected from Mg, B, Al, Ti, Zr and Hf, and is preferably selected from Ti, Zr and Hf.

Typically, the support is at least 50 wt % silica, more typically at least 80 wt %, even more typically at least 90 wt %, most typically at least 95 wt %, especially, about 96 or 97-100 wt %.

Preferably, the level of catalytic alkali metal on the silica support is at least 3 mol %, more preferably at least 4 mol %, most preferably at least 5 mol %, especially, at least 6 mol %.

Typically, the level of catalytic alkali metal on the silica support is up to 10 mol %, more typically, up to 8 mol %, most typically, up to 6 mol %.

Silica

The silica support whether modified or not is generally in the form of a silica gel or pyrogenic silica, typically, a silica gel, more typically, a xerogel, a hydrogel or an aerogel. The silica gel may be formed by any of the various techniques known to those skilled in the art of gel formation such as mentioned herein.

Methods for preparing silica gels are well known in the art and some such methods are described in The Chemistry of Silica: Solubility, Polymerisation, Colloid and Surface Properties and Biochemistry of Silica, by Ralph K Iler, 1979, John Wiley and Sons Inc., ISBN 0-471-02404-X and references therein.

Methods for preparing silica-modifier metal oxide co-gels are known in the art and some such methods are described in U.S. Pat. No. 5,069,816, by Bosman et al in J Catalysis Vol. 148 (1994) page 660 and by Monros et al in J Materials Science Vol. 28, (1993), page 5832.

The silicas of the invention have a mesoporous content within the claimed ranges of the present invention. As mentioned above, silicas with the appropriate mesoporosity may also prepared by alternate preparation routes to gels, such as pyrogenic silica. Typical pyrogenic silica preparation methods and properties are disclosed in the scientific literature, e.g. Chapter 1 "On the Silica Edge" in "The Surface Properties Of Silica", edited by A. P. Legrand, 1998, John Wiley & Sons, ISBN 0-471-95332-6", and Chapter 5 "Silica Gels And Powder", in "The Chemistry Of Silica", R. K. Iler, 1979, John Wiley & Sons, ISBN 0-471-02404-X The typical average surface area of the silica supported catalyst according to any aspect of the invention is in the range 20-1000 $m^2/g$, more preferably 30-800 $m^2/g$ and most preferably 35-500 $m^2/g$ as measured by the B.E.T. multi-point method using a Micromeritics Tristar 3000 Surface Area and porosity analyser. The reference material used for checking the instrument performance may be a carbon black powder supplied by Micromeritics with a surface area of 30.6 $m^2/g$ (+/−0.75 $m^2/g$), part number 004-16833-00.)

The silica component of the support may typically form 80-100 wt % of the support, more typically 90-99.7 wt %, most typically 93.2-99.6 wt % thereof.

The catalyst material of the invention is porous and is a multi-modal combination of mesopores and macropores with an overall average pore size of between 2 and 1000 nm, more preferably between 3 and 500 nm, most preferably between 5 and 250 nm. Macropore size (above 50 nm) can be determined by mercury intrusion porosimetry using NIST standards whilst the Barrett-Joyner-Halenda (BJH) analysis method using liquid nitrogen at 77K is used to determine the pore size of mesopores (2-50 nm). The average pore size is the pore volume weighted average of the pore volume vs. pore size distribution.

The average pore volume of the catalyst particles may be measured by uptake of a fluid such as water. The pore volume can alternatively be measured by a combination of nitrogen adsorption at 77K and mercury porosimetry. The Micromeritics TriStar Surface Area and Porosity Analyser is used to determine pore volume as in the case of surface area measurements and the same standards are employed.

Multimodal Silica

Multimodal distribution is a distribution that has two or more modes. Therefore, it is understood that the term multimodal includes bimodal or trimodal etc. In relation to the present invention, which describes a multimodal pore size distribution, it should be understood that the range of pore sizes of the material is a mixture of two or more unimodal pore size distributions. Accordingly, materials exhibiting multimodal pore size distributions do not merely contain a single unimodal distribution extending over mesoporous and microporous ranges, but instead at least two different modes. It is possible that such modes may be entirely independent or alternatively overlapping.

The average mesopore volume of the catalyst particles may be less than 1 $cm^3/g$ but is generally in the range of 0.2-3 $cm^3/g$, preferably in the range 0.3-2.5 $cm^3/g$, more preferably, 0.4-2 $cm^3/g$, most preferably, 0.5-1.5 $cm^3/g$ as measured by uptake of nitrogen.

The average macropore volume of the catalyst particles may be less than 1 $cm^3/g$ but is generally in the range of 0.1-3 $cm^3/g$, preferably in the range 0.15-2.5 $cm^3/g$, more preferably, 0.2-2 $cm^3/g$, most preferably, 0.2-1.5 $cm^3/g$ as measured by uptake of mercury.

The macropore:mesopore volume ratio of the catalyst particles of the according to any aspect of the present invention are in the range of 0.03-15, optionally in the range 0.4-4, more typically in the range 0.5-2.

Micropores in the catalysts may also be present.

In the present invention, it has been found that controlling the porosity of the silica support as claimed is surprisingly advantageous. However, it is also beneficial to control the volume, distribution and amount of both mesopores and macropores Advantageously, when the multi-modal silica support of the catalyst of the above aspects of the present invention comprises mesopores and macropores, there has been found to be a high reaction selectivity and/or low heavies formation during the production of α, β ethylenically unsaturated carboxylic acids or esters.

Macropores may be formed in otherwise mesoporous silica using a variety of different methods known to those skilled in the art. Suitable techniques include hard and soft template methodology and binder techniques. There are a large number of suitable techniques that can be used to generate macropores in materials. A review—"Hierarchically porous materials: synthesis strategies and structure design", Yang et al, Chem. Soc. Rev., 2017, 46, 481 lists numerous methodologies for making porosity in materials, particularly for macropores, including the following: — surfactant templating
colloidal crystal templating
macroporous polymer templating
bioinspiring process
supercritical fluids
emulsion templating
freeze-drying
breath figures
selective leaching
phase separation
zeolitization process
replication
sol-gel controlling
post-treatment
self-formation
coagulation In one embodiment, the macropores are produced by hard templating. In a further embodiment, the macropores are produced by soft templating. In another further embodiment, the macropores are produced by binder techniques.

By "hard" templating is included the use of a solid insoluble particles, of dimensions of similar size to a required macropore, which may be incorporated into a precursor liquid to form a two-phase solid/liquid slurry that is used to make a silica gel. The solid insoluble particle remains as a discreet phase that can be removed from the resulting silica gel by for example pyrolysis or calcination in an inert or oxidative atmosphere at a high temperature. Literature examples of this type of technology include the following:—

"Multiphased assembly of macroporous silica particles", Journal Of Non-Crystalline Solids 285 (2001) 71-78, C. J. Brinker et al—discloses the use of polymer latex spheres to create macroporous silica, in particular polystyrene beads, which are used as hard templates to generate macro porosity "Impact of Macroporosity on Catalytic Upgrading of Fast Pyrolysis Bio-Oil by Esterification over Silica SulfonicAcids", ChemSusChem. 2017, 10, 3506-3511, K. Wilson et al—details the use of hard templates derived from emulsion polymers from styrene and divinyl benzene to generate macroporous silica with approximately 200 nm macropore diameters;

"Synthesis of three-dimensionally ordered macroporous silica spheres by evaporation-induced assembling template process", Materials Letters 109 (2013) 257-260, Yang et al—this technique is a variant on the methods above, in that a "skeleton" of polystyrene spheres was assembled, infused with a silica precursor, and then the polystyrene sphere templates were removed by calcination to yield a macroporous silica.

By "soft" templating is included the use of either a soluble or insoluble fluid that is incorporated into a precursor liquid such as silica as either a single liquid phase, or a 2-phase liquid/liquid emulsion, that is then used to make a silica gel. The macropores are formed in the resulting silica gel by fluid removal such as by pyrolysis or calcination in an inert or oxidative atmosphere at a high temperature. Literature examples of this type of technology include the following:—

Soluble liquid approach—"Effects of aging and solvent exchange on pore structure of silica gels with interconnected macropores", Journal of Non-Crystalline Solids 189, 1995, 66-76, Takahashi et al—this describes the technique used in the examples in our patent application, of mixing a polymer solution into a silica sol precursor, gelling the precursor and in the process of gelation undergoing phase separation into a silica gel and the polymer—in the case of this particular reference, polyacrylic acid. The resulting two-phase solid is then "heat treated"- to yield a macroporous silica;

Soluble liquid approach—"Synthesis and Textural Characterization of Mesoporous and Meso-/Macroporous Silica Monoliths Obtained by Spinodal Decomposition", Inorganics 2016, 4, 9, Galarneau et al. This uses polyethylene oxides in a silica sol precursor to generate macroporous silica, as the mixed single-phase solution of polymer and silica precursor phase separates;

2 phase liquid/liquid emulsion, specifically micelles of surfactant within a silica precursor—"Ordered nanoporous silica with periodic 30-60 nm pores as an effective support for gold nanoparticle catalysts with enhanced lifetime", J Am Chem Soc. 2010, 132, 9596-7, Fan et al—this paper describes the use of specific templating polymer/surfactant mixtures that form micelles within a gelling silica material, that can then be removed by unspecified thermal processes to yield silica with a range of meso and macropores.

By "binder techniques" is included the use of one or more binder compounds which is incorporated with an at least mesoporous silica powder and optionally water and then formed into a solid body, to be subsequently removed to form a silica body with a macroporous network. The original silica powder may be mesoporous or may include macropores. The silica powder may be formed from a silica gel or pyrogenic silica. The binder originating macropores are formed when the binder is removed from the resulting solid silica by a suitable technique such as pyrolysis/calcination, for example in an oxidative atmosphere at a high temperature or by solvent extraction. The silica powder and binder may be formed into a solid body by extrusion. The pore size produced may for example be determined by the ratio of silica particle:water:binder. Secondary binders may or may not be used in the process.

Two examples of the use of binders or forming agents in the preparation of macroporous catalyst bodies with alternate support chemistries to silica can be found in the following references: —

U.S. Pat. No. 5,137,855 (W. R. Grace & Co) discloses the use of differing amounts of combustible binder to generate different titania supported catalyst extrudates with different macroporosity levels and improved catalyst performance.

U.S. Ser. No. 10/022,702 (IFP Energies Nouvelles) discloses the use of different amounts of liquid or solid pore forming agents in preparation of alumina catalyst particles prepared by coagulation of powders, followed by drying and calcining In addition, to the above techniques, other techniques for forming catalyst bodies are also available which do not use a binder.

Typical methods for forming catalyst bodies which may or may not include a binder can be found in "Manual of Methods and Procedures for Catalyst Characterisation", Pure and Applied Chemistry, Vol. 67, 1257-1306, 1995, J. Haber, J. H. Block, and B. Delmon—these include spray drying of a powder-based suspension in liquid, formation of beads from a sol or gel introduced into either a hot immiscible oil ("oil drop"), granulation of a mix of different sized powders optionally including binder materials, tabletting of a mix of different sized powders optionally including binder materials, and extrusion of a paste of different sized powders optionally including binder materials.

According to a second aspect of the present invention there is provided a method of producing a catalyst according to any of the aspects herein comprising:—
(a) preparing a modified silica by modifying silica with a modifier metal selected from Mg, B, Al, Ti, Zr and Hf,
(b) treating the modified silica with a catalytic alkali metal,
(c) introducing macropores into the silica either before step (a), before step (b) or after step (b).

Preferably, the silica is a silica gel or pyrogenic silica which includes at least mesopores.

Preferably, the macropores are introduced into silica gel by hard templating, soft templating, binder or other techniques such as set out herein.

The macropores may be introduced into silica, modified silica, or modified silica treated with catalytic alkali metal.

It will be appreciated that the silica may have pores in the macroporous range as well as the mesoporous range prior to the introduction of macropores in step (c).

Typically, the silica is in powder form prior to the introduction of macropores by a suitable technique. Suitable treatment of the silica powder may include the addition, if required, of processing aids, liquids and binders to the powdered silica to yield a multiphase particulate mixture of the desired composition and rheology;
formation of silica bodies or particles including, but not limited to, cylinders, tablets, extrudates and structured extrudates, by methodologies including but not limited to extrusion, coagulation, granulation and tabletting;

subsequent thermal processing of the formed bodies or particles to generate a silica containing porous support body, with the appropriate amounts of mesoporosity and macroporosity as set out herein.

Catalytic Alkali Metal

Generally, herein the catalytic alkali metal is an adsorbate adsorbed on the modified silica support surface of the catalyst. The adsorbate may be chemisorbed or physisorbed onto the modified silica support surface, typically, it is chemisorbed thereon.

As will be appreciated, the catalytic alkali metal herein is a metal other than a modifier metal. Preferably, the catalytic alkali metal may be selected from one or more alkali metals. Typically, the catalytic alkali metal is selected from caesium, potassium or rubidium, more preferably, caesium.

Suitably the catalytic alkali metals may be present in the catalyst at a level of at least 1 mol/100 (silicon+any modifier metal) mol more preferably, at least 1.5 mol/100 (silicon+ any modifier metal) mol, most preferably, at least 2 mol/100 (silicon+any modifier metal) mol, more preferably, at least 3 mol/100 (silicon+any modifier metal) mol, most preferably, at least 3.5 mol/100 (silicon+any modifier metal) mol. The level of catalytic alkali metal may be up to 10 mol/100 (silicon+modifier metal) mol in the catalyst, more preferably, up to 6 mol or 7.5 mol/100 (silicon+modifier metal) mol, most preferably, up to 5 mol/100 (silicon+modifier metal) mol in the catalyst.

Preferably, the level of catalytic alkali metal in the catalyst is in the range from 1-10 mol/100 (silicon+modifier metal) mol, more preferably, 2-8 mol/100 (silicon+modifier metal) mol, most preferably, 2.5-6 mol/100 (silicon+modifier metal) mol in the catalyst.

Alternatively, the catalyst may have a wt % of catalytic alkali metal in the range 1 to 22 wt % in the catalyst, more preferably 4 to 18 wt %, most preferably, 5-13 wt %.

Accordingly, the catalytic alkali metal:modifier metal mole ratio is typically at least 1.4 or 1.5:1, preferably, it is in the range 1.4 to 5:1 such as 1.5 to 4.0:1, especially, 1.5 to 3.6:1. Generally, herein, the catalytic alkali metal is in excess of that which would be required to neutralise the modifier metal.

Preferably, the catalytic alkali metal is present in the range 0.5-7.0 mol/mol modifier metal (if present), more preferably 1.0-6.0 mol/mol, most preferably 1.5-5.0 mol/mol modifier metal.

Unless indicated to the contrary, amounts of alkali metal or alkali metal in the catalyst relate to the alkali metal ion and not the salt.

Suitably, the catalytic alkali metal may be incorporated into the silica support by any method known in the art such as impregnation or adsorption, co-gelation or vapour deposition with the catalytic metal.

Levels of catalytic metal in the catalyst whether mol % or wt % may be determined by appropriate sampling and taking an average of such samples. Typically, 5-10 samples of a particular catalyst batch would be taken and alkali metal levels determined and averaged, for example by XRF, atomic absorption spectroscopy, neutron activation analysis, ion coupled plasma mass spectrometry (ICPMS) analysis or ion coupled plasma atomic emission spectroscopy (IC-PAES).

Modification of the Silica Support—Modifier Metal

The silica of the invention may be provided as a co-gel of the modifier metal oxide and silica or as a modified silica with the modifier metal adsorbed on the silica surface.

Typically, the modifier metal is adsorbed on the silica gel support surface. Typically, said modifier metal is present on the modified silica gel support surface in the form of metal oxide moieties. The modifier metal oxide may be distributed through the matrix of the silica as well as the surface thereof.

Typically, the modified silica gels are produced by a suitable adsorption reaction. Adsorption of the relevant metal compounds to a silica gel such as a silica xerogel to form a modified silica gel having the relevant modifier metal moieties is a suitable technique.

Typically, when the modifier metal is added as an adsorbate it may be added as a mono- or dinuclear modifier metal compound. It has been found that controlling the nuclearity of the modifier metal moieties is surprisingly advantageous because it helps control the proximity of neighbouring modifier metal moieties on the silica.

Typically, the modifier metal compound is a complex and the ligands in the coordination sphere of the compound are generally of sufficient size to prevent further oligomerisation of the modifier metal, and/or significant increase in nuclearity of the complex, prior to and/or after adsorption. Generally, increase in nuclearity to dimers may be acceptable. Typically, the modifier metal complex is an organic complex with one or more organic polydentate chelating ligands, or alternatively a complex with sterically bulky monodentate ligands effective to stabilise the nuclearity.

Typically, at least 25%, of the said modifier metal either before or after calcination is present on the support in the form of mono- or dinuclear modifier moieties. Accordingly, typically, at least 25%, of the said modifier metal is present on the support in the form of modifier metal moieties derived from a mono- or dinuclear metal compounds.

Typically, the mono- or dinuclear modifier metal contacts the silica support as a mono- or dinuclear modifier metal compound in solution to effect adsorption of the said modifier metal onto the support.

Typically, the modifier metal compound is mononuclear or dinuclear, for example, mononuclear.

Advantageously, when modifier metal is incorporated in the multimodal silica of the above aspects of the present invention there has been found to be a reduced rate of sintering of the catalyst surface during the production of α, β ethylenically unsaturated carboxylic acids or esters. The addition of modifier metal prevents sintering and loss of mesopore surface area.

The combination of the modifier metal preventing sintering of the mesopores and the presence of a macropore network allows for the preservation of an open pore structure, that allows diffusion of raw materials throughout the catalyst pellet and effusion of products and by-products from the catalyst surfaces within the catalyst pellet, which reduces the formation of "heavy" by-products formed by unwanted coupling reactions. This advantageous combination results in improved reaction selectivity to product. Typically, the modifier metal is selected from zirconium, hafnium and/or titanium.

Typically, the metal compound is a complex which comprises two or more chelating ligands, preferably, 2, 3 or 4 chelating ligands. The chelating ligands herein may be bi, tri, tetra or polydentate. However, it is also possible for the compound to include bulky monodentate ligands which are also effective to effectively space as set out herein the modifier metals on the silica surface.

Typically, the metal complex is tetracoordinate, pentacoordinate, hexacoordinate, heptacoordinate, or octacoordinate.

Advantageously, the size of the ligands in the coordination sphere of the modifier metal compound such as the size of the chelating ligands causes the modifier metal to be more disperse than the same modifier metal with a simple counterion such as nitrate, acetate or oxynitrate. It has been found that smaller metal salt adsorption leads to clustering of the modifier metal following heat treatment or calcination which in turn lowers the selectivity of the catalyst and lowers sintering resistance of the catalyst.

In some embodiments of the invention, the modifier metal is an adsorbate adsorbed on the silica support surface of the catalyst. The adsorbate may be chemisorbed or physisorbed onto the silica support surface as its compound, typically, it is chemisorbed thereon.

Suitable chelating ligands herein may be non-labile ligands optionally selected from molecules with lone pair containing oxygen or nitrogen atoms able to form 5 or 6 membered rings with a modifier metal atom. Examples include diones, diimines, diamines, diols, dicarboxylic acids or derivatives thereof such as esters, or molecules having two different such functional groups and in either case with the respective N or O and N or O atom separated by 2 or 3 atoms to thereby form the 5 or 6 membered ring. Examples include pentane-2,4-dione, esters of 3-oxobutanoic acid with aliphatic alcohols containing 1-4 carbon atoms such as ethyl 3-oxobutanoate, propyl 3-oxobutanoate, isopropyl 3-oxobutanoate, n-butyl 3-oxobutanoate, t-butyl 3-oxobutanoate, heptane-3,5-dione, 2,2,6,6,-Tetramethyl-3,5-heptanedione, 1,2-ethanediol, 1,2-propanediol, 1,3-propanediol, 1,3-butanediol, 1,2-butanediol, 1,2-diaminoethane, ethanolamine, 1,2-diamino-1,1,2,2-tetracarboxylate, 2,3-dihydroxy-1,4-butanedioate, 2,4-dihydroxy-1,5-pentanedioate, salts of 1,2-dihydroxylbenzene-3-5-disulphonate, diethylenetriaminepentaacetic acid, nitrolotriacetic acid, N-hydroxyethylethylenediaminetriacetic acid, N-hydroxyethyliminodiacetic acid, N,N-dihydroxyethylglycine, oxalic acid and its salts. Pentane-2,4-dione, heptane-3,5-dione, 2,2,6,6-Tetramethyl-3,5-heptanedione, ethyl 3-oxobutanoate and t-butyl 3-oxobutanoate are most preferred. The smaller bidentate chelating ligands having, for example less than 10 carbon and/or hetero atoms in total enable small complexes to be formed which can allow higher concentrations to be deposited on the surface of the silica compared to larger ligands. Accordingly, the mononuclear or dinuclear modifier metal cation source herein may be in the form of complexes of modifier metal with such smaller chelating ligands, preferably, with at least one such ligand. Such compounds may include labile ligands such as solvent ligands, for example in alcohol solvent, alkoxide ligands such as ethoxide or propoxide etc.

The chelating ligand is typically a non-labile ligand. By non-labile ligand is meant a ligand that is co-ordinated to the modifier metal and is not removed by the adsorption of the modifier metal onto the silica surface. Accordingly, the non-labile ligand is typically coordinated to the modifier metal in solution prior to treatment of the silica surface with modifier metal. For the avoidance of doubt, the non-labile ligand is typically removed by suitable treatment of the silica surface following adsorption of the modifier metal.

The size of the chelating ligands is selected so as to space the modifier metal atoms apart on the silica surface to prevent combination thereof during the catalyst production.

Alternatively, modifier metal complexes with bulky monodentate ligands—to prevent oligomerisation of the metal complexes—can be used. Typical ligands used in said complexes include, but are not limited to, alkoxides with suitable organic groups such as tert-butoxide or 2,6 di tert-butyl phenoxide, amides with suitable organic groups such as dialkylamides (methyl, ethyl and higher linear and branched alkyl groups, as well as bis (trimethylsilylamido) complexes, and alkyl ligands with suitable organic groups such as 2,2-dimethylpropyl (neopentyl) ligands.

Typically, the silica support has isolated silanol groups and by contacting the silica support with the modifier metal species, the modifier metal is adsorbed onto the surface of the silica support through reaction with said silanol groups.

Preferably, the adsorbed or co-gelated modifier metal cations are sufficiently spaced apart from each other by the modifier metal compound to substantially prevent oligomerisation thereof during subsequent treatment steps such as the impregnation of catalytic metal, or optionally, subsequent calcination, more preferably di, tri or oligomerisation thereof with neighbouring modifier metal cations.

Typically, the support comprises the said modifier metal moieties at a level of $>0.025$ per $nm^2$, more preferably, at a level of from 0.05, most preferably, at a level of from 0.1 moieties per $nm^2$.

Typically, at least 30%, such as at least 35%, more preferably at least 40%, such as at least 45%, most suitably at least 50%, such as at least 55%, for example at least 60% or 65%, and most preferably at least 70% such as at least 75% or 80%, more typically, at least 85%, most typically, at least 90%, especially, at least 95% of the modifier metal in the modifier metal complex are mononuclear and/or dinuclear modifier metal compounds when the complex is contacted with the support to effect adsorption of the said complex onto the support. Accordingly, the level of mononuclear and/or dinuclear modifier metal on the silica surface may be at such levels.

Preferably, the silica support is dried and/or calcined prior to treatment with the modifier metal.

Accordingly, the modifier metal may be incorporated onto the support as a cation source, more preferably, a solution of compounds of the said modifier metal so that the compounds are in solution when contacted with the support to effect adsorption onto the support.

Typically, the solvent for the said solution is water or other than water.

Typically, the solvent is an organic solvent such as toluene or heptane, Further, the solvent may be an aliphatic or aromatic solvent. Still further, the solvent may be a chlorinated solvent such as dichloromethane. More typically, the solvent is an aliphatic alcohol, typically selected from C1-C6 alkanols such as methanol, ethanol, propanol, isopropanol, butanols, pentanols and hexanols, more typically, methanol, ethanol or propanols.

Examples of suitable metal cation sources herein include inorganic and organic complexes such as zirconium (pentane-2,4-dione)$_4$, zirconium(ethyl 3-oxobutanoate)$_4$, zirconium(heptane-3,5-dione)$_4$, zirconium(2,2,6,6-tetramethyl-heptane-3,5-dione)$_4$, zirconium(propoxide)(pentane-2-3-dione)$_3$, zirconium(propoxide)$_3$(2,2,6,6-tetramethyl-3,5-heptanedione) (zirconium(Ot-butyl)$_3$(t-butyl 3-oxobutanoate), zirconium(Ot-butyl)$_2$(t-butyl 3-oxobutanoate)$_2$ and metal salts such as zirconium(IV) chloride, zirconium(IV) carbonate, zirconium(IV) perchlorate, zirconium(IV) nitrate, zirconium(IV) oxynitrate, zirconium(IV) oxysulphate, zirconium(IV) lactate, zirconium(IV) tetraacetate and zirconium(IV) oxychloride.

Examples of suitable metal cation sources herein include organic complexes such as titanium tetrakis(methoxide), titanium tetrakis(ethoxide), titanium tetrakis(n-propoxide), titanium tetrakis(i-propoxide), titanium tetrakis(n-butoxide), titanium tetrakis(t-butoxide), titanium tetrakis(2-ethylhexyloxide), titanium oxide bis(acetylacetonate), titanium oxide bis(2,2,6,6-tetramethyl-3,5-heptanedionate), titanium (triethanolaminato)isopropoxide, titanium bis(triethanolamine) di-isopropoxide, titanium tetrakis(diethylamide), titanium tetrakis(ethylmethylamide), titanium tetrakis(dimethylamide), titanium tetrakis(neopentyl), titanium(IV) bis(ammonium lactate)dihydroxide and metal salts such as titanium (IV) oxysulphate, titanium(IV) oxynitrate, titanium(IV) oxychloride, titanium(IV) chloride, titanium(IV) carbonate, titanium(IV) perchlorate, titanium(IV) nitrate, titanium(IV) lactate, titanium(IV) tetraacetate.

The metal cation source may be provided as an organic complex.

In one embodiment, the metal cation source is provided as a solution of one or more of zirconium(IV)acetylacetonate (zirconium,tetrakis(2,4-pentanedionato-O,O')) zirconium (heptane-3,5-dione)$_4$, zirconium(2,2,6,6-tetramethyl-3,5-heptanedione)$_4$, zirconium(IV) ethyl 3-oxobutanoate, zirconium(IV) t-butyl 3-oxobutanoate, or zirconium(IV) i-propyl 3-oxobutanoate in one of methanol, ethanol, isopropanol, propanol, butanol, isobutanol, or 2-butanol.

Preferably, after adsorption of the modifier metal onto the silica support, the solvent is removed by evaporation.

Optionally, the modified silica support is calcined to remove any ligands or other organics from the modified support.

When the modifier metal is present in the support in the form of a co-gel, the modified silica support is a silica-modifier metal oxide co-gel. In such embodiments, the modifier metal is typically incorporated in an even dispersion throughout the silica-modifier metal oxide structure.

Typically, the modifier metal whether an adsorbate or a co-gel is present in mononuclear or dinuclear oxide moieties. Typically, when the modifier metal is added as an adsorbate it may be added as a mono- or dinuclear modifier metal compound.

Typically, the modifier metal when present is uniformly dispersed throughout the surface of the silica support or uniformly dispersed throughout the silica modifier metal oxide structure.

For the avoidance of doubt, the modifier metals on the silica support of the catalyst according to the present invention relate to modifier metals such as magnesium, boron, aluminium, titanium, zirconium and hafnium, not to silica.

Preferably, the level of modifier metal present in the modified silica or catalyst may be up to $7.6 \times 10^{-2}$ mol/mol of silica, more preferably up to $5.9 \times 10^{-2}$ mol/mol of silica, most preferably up to $3.5 \times 10^{-2}$ mol/mol of silica. Typically, the level of such metal is between $0.067 \times 10^{-2}$ and $7.3 \times 10^{-2}$ mol/mol of silica, more preferably, between $0.13 \times 10^{-2}$ and $5.7 \times 10^{-2}$ mol/mol of silica and most preferably between $0.2 \times 10^{-2}$ and $3.5 \times 10^{-2}$ mol/mol of silica. Typically, the level of modifier metal present is at least $0.1 \times 10^{-2}$ mol/mol of silica, more preferably, at least $0.15 \times 10^{-2}$ mol/mol of silica and most preferably at least $0.25 \times 10^{-2}$ mol/mol of silica.

Preferably, the % w/w level of modifier metal will depend on the metal but may be up to 20% w/w of the modified silica support, more preferably up to 16% w/w, most preferably up to 11% w/w. Typically, the level of modifier metal is between 0.02-20% w/w of the modified silica support, more preferably between 0.1-15% w/w and most preferably between 0.15-10% w/w. Typically, the level of modifier metal is at least 0.02% w/w such as 0.25% w/w of the modified silica support, for example, 0.4% w/w, more typically, at least 0.5% w/w, most typically, at least 0.75% w/w.

Levels of the metal oxide of particular types in the catalyst/support are determined by XRF, atomic absorption spectroscopy, neutron activation analysis, ion coupled plasma mass spectrometry (ICPMS) analysis or ion coupled plasma atomic emission spectroscopy (ICPAES).

Catalyst

Typically, the catalyst of the invention may be in any suitable form. Typical embodiments are in the form of discrete particles. Typically, in use, the catalyst is in the form of a fixed bed of catalyst. Alternatively, the catalyst may be in the form of a fluidised bed of catalyst. A further alternative is a monolith reactor.

Where the catalysts are used in the form of a fixed bed, it is desirable that the supported catalyst is formed into granules, aggregates or shaped units, e.g. spheres, cylinders, rings, saddles, stars, poly-lobes prepared by pelleting, or extrusion, typically having maximum and minimum dimensions in the range 1 to 10 mm, more preferably, with a mean dimension of greater than 2 mm such as greater than 2.5 or 3 mm. The catalysts are also effective in other forms, e.g. powders or small beads of the same dimensions as indicated. Where the catalysts are used in the form of a fluidised bed it is desirable that the catalyst particles have a maximum and minimum dimension in the range of 10-500 μm, preferably 20-200 μm, most preferably 20-100 μm.

Catalytic and Modifier Metal Amounts

The total metal content of the catalyst is at least 80 wt % catalytic alkali metal and modifier metal as defined herein. Typically, the total metal content of the catalyst is at least 85 wt % catalytic alkali metal and modifier metal as defined herein, more typically at least 90 wt %, even more typically at least 95 wt %, most typically at least 99 wt %, especially at least 99.5 wt %, such as at least 99.9 wt %.

Tungsten/Antimony/Vanadium/Bismuth Exclusion

The catalyst according to the present invention is as set out hereinabove may be substantially free, may be essentially free or may be completely free of tungsten and/or antimony and/or vanadium and/or bismuth and/or a metal of Group 3 and/or a metal of Group 8, 9 or 10 and/or a metal of Group 13 and/or a metal of Group 14. Tungsten and/or antimony and/or vanadium and/or bismuth and/or a metal of Group 3 and/or a metal of Group 8, 9 or 10 and/or a metal of Group 13 and/or a metal of Group 14 may be present in trace amounts because of unavoidable contamination from the environment. By "substantially free" we mean to refer to catalysts and supports containing less than 1000 parts per million (ppm) of tungsten and/or antimony and/or vanadium and/or bismuth and/or a metal of Group 3 and/or a metal of Group 8, 9 or 10 and/or a metal of Group 13 and/or a metal of Group 14. By "essentially free" we mean to refer to catalysts and supports containing less than about 100 ppm of tungsten and/or antimony and/or vanadium and/or bismuth and/or an metal of Group 3 and/or an metal of Group 8, 9 or 10 and/or a metal of Group 13 and/or a metal of Group 14 and by "completely free" we mean to refer to catalysts containing less than 200 parts per billion (ppb) of tungsten and/or antimony and/or vanadium and/or bismuth and/or an metal of Group 3 and/or an metal of Group 8, 9 or 10 and/or a metal of Group 13 and/or a metal of Group 14.

By the term "a metal of Group 3" we include the metals Sc, Y and the whole set of lanthanides and actinides. Preferably, the metals are selected from La or Ce. For the avoidance of doubt, reference to a metal of Group 3 herein refers to modern IUPAC nomenclature. Therefore, Group 3 should be taken to include Transition Metal Group 111B and the Lanthanide and Actinide blocks according to older nomenclature schemes.

By the term "a metal of Group 8, 9 or 10" we include metals such as Ni, Pd, Pt and Ds. Preferably, the metal is Pt.

For the avoidance of doubt, reference to a metal of Group 8, 9 or 10 herein refers to modern IUPAC nomenclature. Therefore, Group 8, 9 or 10 should be taken to include Transition Metal Group VIII according to older nomenclature schemes.

By the term "a metal of Group 13" we include metals such as B, Al, Ga, In and Tl. Preferably, the metal is Al. For the avoidance of doubt, reference to a metal of Group 13 herein refers to modern IUPAC nomenclature. Therefore, Group 13 should be taken to include Main Group III, 3 or IIIA according to older nomenclature schemes.

By the term "a metal of Group 14" we include metals such as Ge, Sn and Pb. Preferably, the metal is Sn. For the avoidance of doubt, reference to a metal of Group 14 herein refers to modern IUPAC nomenclature. Therefore, Group 14 should be taken to include Main Group IV, 4 or IVA according to older nomenclature schemes.

Silanols

The silanol group concentration on the silica support may be decreased prior to treatment with the modifier metal compounds by calcination treatment, chemical dehydration or other suitable methods.

A suitable method of treating the silica to provide isolated silanol groups at the level required is by calcination. However, other techniques such as hydrothermal treatment or chemical dehydration are also possible. U.S. Pat. No. 5,583,085 teaches chemical dehydration of silica with dimethyl carbonate or ethylene dicarbonate in the presence of an amine base. U.S. Pat. Nos. 4,357,451 and 4,308,172 teach chemical dehydration by chlorination with $SOCl_2$ followed by dechlorination with $H_2$ or ROH followed by oxygen in a dry atmosphere. Chemical dehydration may provide up to 100% removal of silanols against a minimum of $0.7/nm^2$ by thermal treatment. Thus, in some instances, chemical dehydration may provide more scope for silanol group control.

The term isolated silanol (also known as single silanol) is well known in the art and distinguishes the groups from vicinal or geminal or internal silanols. Suitable methods for determining the incidence of isolated silanols include surface sensitive infrared spectroscopy and 1H NMR or $^{31}Si$ NMR.

As mentioned, the silica support may be dried or calcined prior to treatment with the modifier metal cation source. The modified silica formed may irrespective of whether previously dried or calcined be dried or calcined prior to addition of the catalytic metal.

The silica may be in the form of a multimodal gel prior to treatment with the modifier metal. The gel may be in the form of a hydrogel, a xerogel or an aerogel at the commencement of modification.

The multimodal silica support may be a xerogel, hydrogel or aerogel. In one embodiment, the silica support is a xerogel.

General Process

It will be understood by a skilled person that the catalytic alkali metal may be added to the modified silica by any suitable means. Typically, in order to produce the modified silica catalyst, the silica is contacted with a catalytic alkali metal.

Typically, in order to produce the catalyst, the silica support is contacted with an acidic, neutral or alkaline aqueous solution containing a catalytic alkali metal such as caesium, more typically, the catalytic alkali metal is in the form of a salt of a catalytic alkali metal, most typically, the silica support is contacted with an alkaline aqueous solution containing catalytic alkali metal such as caesium, in the form of a salt of a catalytic alkali metal and a base. Alternatively, the support can be contacted with a water miscible solution of the catalytic alkali metal salt in an organic solvent. Preferred solvents are alcohols such as methanol, ethanol, propanol and isopropanol, preferably methanol. The most preferred solvent is methanol.

Most preferably, the catalytic alkali metal is added as a salt solution in methanol. Low levels of water, typically up to 20 vol % can be contained in the solutions.

Typically, the conditions of temperature, contact time and pH during this stage of the catalyst production process are such as to allow for impregnation of the multimodal silica support with the catalytic alkali metal to form a multimodal silica supported catalyst.

Typical conditions of temperature for this step are between 5-95° C., more typically 10-80° C. and most typically between 20-70° C. The temperature for this step may be at least 5° C., more typically at least 10° C., most typically, at least 20° C.

Typical contact times between the support and the catalytic metal containing solution for this step may be between 0.05-48 hours, more typically between 0.1-24 hours, most typically between 0.5-18 hours. The contact time may be at least 0.05 hours, more typically at least 0.1 hours, most typically at least 0.5 hours.

The concentration of the catalytic metal salt solution for this step is dependent on a large number of factors including the solubility limit of the catalytic metal compound, the desired loading of the catalytic metal on the support and the method of addition, including the amount of liquid used to impregnate the support, the pH and the choice of the catalytic metal compound. The concentration in solution is best determined by experiment.

Suitable salts of catalytic alkali metals for incorporation of the catalytic metal generally may be selected from one or more of the groups consisting of formate, acetate, propionate, hydrogen carbonate, chloride, nitrate, hydroxide and carbonate, more typically, hydroxide, acetate or carbonate and most typically hydroxide and/or carbonate. The pH can be controlled during the impregnation by addition of ammonia with the metal compound or by using an appropriate catalytic metal compound such as the formate, carbonate, acetate or hydroxide, more preferably, the hydroxide or carbonate, in all cases either alone, in combination, or together with an appropriate carboxylic acid. The control of the pH in the preferred ranges is most important at the end of the impregnation to effect satisfactory adsorption. Most typically, these salts may be incorporated using an alkaline solution of the salt. If the salt is not itself alkaline then a suitable base such as ammonium hydroxide may be added. As hydroxide salts are basic in nature, mixtures of one or more of the above salts with the hydroxide salt of the particular catalytic metal such as caesium may conveniently be prepared.

It will be understood by the skilled person that a catalytic alkali metal or modifier metal of the present invention may be added to the silica support by any suitable means. The catalytic and/or modifier metal may be fixed, typically by calcination, onto the support after deposition of the metal onto the support.

Generally, drying of the silica support is achieved by appropriate methods known to the skilled person such as in a drying unit or oven.

Typically, the catalyst contains between 0.01-25% w/w water, more typically 0.1-15% w/w water and most typically between 0.5%-5.0 w/w water.

Optionally, the silica supported catalyst containing catalytic metal may be dried or calcined, the process of calcination is well known to those skilled in the art.

In some cases, it may be necessary to calcine the support formed from the modification stage at 200-1000° C., more typically, 300-800° C., most typically, 350-600° C. prior to addition of the catalytic metal. In preferred calcinations of the support formed from the modification stage, the temperature is at least 375° C., such as 400° C. The calcination atmosphere should typically contain some oxygen, suitably 1-30% oxygen and most suitably 2-20% oxygen to effect removal of the organic residues as carbon dioxide and water. The calcination time may typically be between 0.01 and 100 hours, suitably 0.5-40 hours, most suitably 1-24 hours. In preferred calcinations of the catalyst, the temperature is at least 450° C., more preferably, at least 475° C., most preferably, at least 500° C., especially, at least 600° C., more especially, above 700° C. Typically, the calcination temperature is in the range 400-1000° C., more typically, 500-900° C., most typically, 600-850° C. The calcined support such as xerogel material should be cooled to the appropriate temperature for impregnation.

Addition of the catalytically active metal can be carried out by the method described above or can be by any other normal method used to impregnate catalyst supports, such as xerogel supports, such as using water or a solvent other than water such as an alcohol, suitably methanol, ethanol, propanol or isopropanol or using the incipient wetness method where only sufficient solution is added to the xerogel supports to fill the pores of the xerogel support. In this case, the concentration of the catalytically active metal may be calculated so as to introduce the target amount of catalytically active metal to the xerogel support material rather than providing an excess of solution of lower concentration. The addition of the catalytically active metal may utilise any preferred methodology known in the art.

The drying of the modified silica prior to calcination may take place in the temperature range of 20–200° C., more typically, 30-180° C., most typically, 40-150° C. The drying of the modified silica prior to calcination may take place at atmospheric or sub-atmospheric pressures, in the range of 0.001-1.01 bar. The drying of the modified silica may also be effected under a flow of inert gas in a static or fluidised bed. The drying times may be in the range between 0.1-24 hours, more typically between 0.5-12 hours, most typically between 1 and 6 hours.

Reduced pressure drying at lower temperatures or fluidised bed drying with an inert gas are suitable techniques.

General Properties

The modifier metal and catalytic alkali metal adsorbates in the final catalyst are generally metal oxide moieties.

According to a third aspect of the present invention there is provided a method of producing an ethylenically unsaturated carboxylic acid or ester, typically, an a, β ethylenically unsaturated carboxylic acid or ester, comprising the steps of contacting formaldehyde or a suitable source thereof with a carboxylic acid or ester in the presence of catalyst and optionally in the presence of an alcohol, wherein the catalyst is according to the first or any of the other aspects of the present invention defined herein.

Advantageously, it has also been found that catalysts comprising silicas as defined herein and containing a catalytic alkali metal are remarkably effective catalysts for the production of a, β ethylenically unsaturated carboxylic acid or esters by condensation of the corresponding acid or ester with a methylene source such as formaldehyde.

By the term "a suitable source thereof" in relation to formaldehyde of the third aspect of the present invention is meant that the free formaldehyde may either form in situ from the source under reaction conditions or that the source may act as the equivalent of free formaldehyde under reaction conditions, for example it may form the same reactive intermediate as formaldehyde so that the equivalent reaction takes place.

A suitable source of formaldehyde may be a compound of formula (1):

wherein $R^5$ and $R^6$ are independently selected from $C_1$-$C_{12}$ hydrocarbons or H, X is O, n is an integer from 1 to 100, and m is 1.

Typically, $R^5$ and $R^6$ are independently selected from $C_1$-$C_{12}$ alkyl, alkenyl or aryl as defined herein, or H, more suitably, $C_1$-$C_{10}$ alkyl, or H, most suitably, $C_1$-$C_6$ alkyl or H, especially, methyl or H. Typically, n is an integer from 1 to 10, more suitably 1 to 5, especially, 1-3.

However, other sources of formaldehyde may be used including trioxane.

Therefore, a suitable source of formaldehyde also includes any equilibrium composition which may provide a source of formaldehyde. Examples of such include but are not restricted to dimethoxymethane, trioxane, polyoxymethylenes $R^1$—O—$(CH_2$—O$)_i$—$R^2$ wherein $R^1$ and/or $R^2$ are alkyl groups or hydrogen, i=1 to 100, paraformaldehyde, formalin (formaldehyde, methanol, water) and other equilibrium compositions such as a mixture of formaldehyde, methanol and methyl propionate.

Polyoxymethylenes are higher formals or hemiformals of formaldehyde and methanol $CH_3$—O—$(CH_2$—O$)_i$—$CH_3$ ("formal-i") or $CH_3$—O—$(CH_2$—O$)_i$—H ("hemiformal-i"), wherein i=1 to 100, suitably, 1-5, especially 1-3, or other polyoxymethylenes with at least one non methyl terminal group. Therefore, the source of formaldehyde may also be a polyoxymethylene of formula $R^{31}$—O—$(CH_2$—O—$)_iR^2$, where $R^{31}$ and $R^{32}$ may be the same or different groups and at least one is selected from a $C_1$-$C_{10}$ alkyl group, for instance $R^{31}$=isobutyl and $R^2$=methyl.

Generally, the suitable source of formaldehyde is selected from dimethoxymethane, lower hemiformals of formaldehyde and methanol, $CH_3$—O—$(CH_2$—O$)_i$—H where i=1-3, formalin or a mixture comprising formaldehyde, methanol and methyl propionate.

Typically, by the term formalin is meant a mixture of formaldehyde:methanol:water in the ratio 25 to 65%:0.01 to 25%:25 to 70% by weight. More typically, by the term formalin is meant a mixture of formaldehyde:methanol:water in the ratio 30 to 60%:0.03 to 20%:35 to 60% by weight. Most typically, by the term formalin is meant a mixture of formaldehyde:methanol:water in the ratio 35 to 55%:0.05 to 18%:42 to 53% by weight.

Typically, the mixture comprising formaldehyde, methanol and methyl propionate contains less than 5% water by weight. More suitably, the mixture comprising formaldehyde, methanol and methyl propionate contains less than 1% water by weight. Most suitably, the mixture comprising formaldehyde, methanol and methyl propionate contains 0.1 to 0.5% water by weight.

According to a fourth aspect of the present invention, there is provided a process for preparing an ethylenically unsaturated acid or ester comprising contacting an alkanoic acid or ester of the formula $R^1$—$CH_2$—$COOR^3$, with formaldehyde or a suitable source of formaldehyde of formula (1) as defined below:

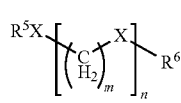

where R5 is methyl and R6 is H;
X is O;
m is 1;
and n is any value between 1 and 20 or any mixture of these;
in the presence of a catalyst according to any aspect of the present invention, and optionally in the presence of an alkanol; wherein R1 is hydrogen or an alkyl group with 1 to 12, more Suitably, 1 to 8, most suitably, 1 to 4 carbon atoms and R3 may also be independently, hydrogen or an alkyl group with 1 to 12, more suitably, 1 to 8, most suitably, 1 to 4 carbon atoms.

Therefore, the present inventors have discovered that the catalysts according to the present invention enable surprising improvement in selectivity for the condensation of methylene sources such as formaldehyde with a carboxylic acid or alkyl ester such as methyl propionate to form ethylenically unsaturated carboxylic acids. In addition, the generation of heavies during the condensation reaction is significantly and surprisingly reduced.

Accordingly, one particular process for which the catalysts of the present invention have been found to be particularly advantageous is the condensation of formaldehyde with methyl propionate in the presence of methanol to produce MMA.

In the case of production of MMA, the catalyst is typically contacted with a mixture comprising formaldehyde, methanol and methyl propionate.

The process of the third or fourth aspect of the invention is particularly suitable for the production of acrylic and alkacrylic acids and their alkyl esters, particularly, alkacrylic acids and alkyl esters thereof, and also methylene substituted lactones. Suitable methylene substituted lactones include 2-methylene valerolactone and 2-methylene butyrolactone from valerolactone and butyrolactone respectively. Suitable, (alk)acrylic acids and their esters are ($C_{0-8}$alk) acrylic acid or alkyl ($C_{0-8}$alk)acrylates, typically from the reaction of the corresponding alkanoic acid or ester thereof with a methylene source such as formaldehyde in the presence of the catalyst, suitably the production of methacrylic acid, acrylic acid, methyl methacrylate, ethyl acrylate or butyl acrylate, more suitably, methacrylic acid or especially methyl methacrylate(MMA) from propanoic acid or methyl propionate respectively. Accordingly, in the production of methyl methacrylate or methacrylic acid, the preferred ester or acid of formula $R^1$—$CH_2$—$COOR^3$ is methyl propionate or propionic acid respectively and the preferred alkanol is therefore methanol. However, it will be appreciated that in the production of other ethylenically unsaturated acids or esters, the preferred alkanols or acids will be different.

The reaction of the present invention may be a batch or continuous reaction.

Typical conditions of temperature and gauge pressure in the process of the third or fourth aspect of the invention are between 100° C. and 400° C., more preferably, 200° C. and 375° C., most preferably, 275° C. and 360° C.; and/or between 0.001 MPa and 1 MPa, more preferably between 0.03 MPa and 0.5 MPa, most preferably between 0.03 MPa and 0.3 MPa. Typical residence times for the reactants in the presence of the catalyst are between 0.1 and 300 secs, more preferably between, 1-100 secs, most preferably between 2-50 secs, especially, 3-30 secs.

The amount of catalyst used in the process of production of product in the present invention is not necessarily critical and will be determined by the practicalities of the process in which it is employed. However, the amount of catalyst will generally be chosen to effect the optimum selectivity and yield of product and an acceptable temperature of operation. Nevertheless, the skilled person will appreciate that the minimum amount of catalyst should be sufficient to bring about effective catalyst surface contact of the reactants. In addition, the skilled person would appreciate that there would not really be an upper limit to the amount of catalyst relative to the reactants but that in practice this may be governed again by the contact time required and/or economic considerations.

The relative amount of reagents in the process of the third or fourth aspect of the invention can vary within wide limits but generally the mole ratio of formaldehyde or suitable source thereof to the carboxylic acid or ester is within the range of 20:1 to 1:20, more suitably, 5:1 to 1:15. The most preferred ratio will depend on the form of the formaldehyde and the ability of the catalyst to liberate formaldehyde from the formaldehydic species. Thus highly reactive formaldehydic substances where one or both of $R^{31}$ and $R^{32}$ in $R^{31}O$—$(CH_2$—$O)_xR^{32}$ is H require relatively low ratios, typically, in this case, the mole ratio of formaldehyde or suitable source thereof to the carboxylic acid or ester is within the range of 1:1 to 1:9. Where neither of $R^{31}$ and $R^{32}$ is H, as for instance in $CH_3O$—$CH_2$—$OCH_3$, or in trioxane higher ratios are most preferred, typically, 6:1 to 1:3.

As mentioned above, due to the source of formaldehyde, water may also be present in the reaction mixture. Depending on the source of formaldehyde, it may be necessary to remove some or all of the water therefrom prior to catalysis. Maintaining lower levels of water than that in the source of formaldehyde may be advantageous to the catalytic efficiency and/or subsequent purification of the products. Water at less than 10 mole % in the reactor is preferred, more suitably, less than 5 mole %, most suitably, less than 2 mole %.

The molar ratio of alcohol to the acid or ester is typically within the range 20:1 to 1:20, preferably 10:1 to 1:10, most preferably 5:1 to 1:5, for example 1:1.5. However the most preferred ratio will depend on the amount of water fed to the catalyst in the reactants plus the amount produced by the reaction, so that the preferred molar ratio of the alcohol to the total water in the reaction will be at least 1:1 and more preferably at least 2:1.

The reagents of the third or fourth aspect may be fed to the reactor independently or after prior mixing and the process of reaction may be continuous or batch. Typically, however, a continuous process is used.

Typically, the method of the third or fourth aspect of the present invention is carried out when reactants are in the gaseous phase.

In a still further aspect, the invention extends to the process of producing an ethylenically unsaturated carboxylic acid or ester according to any of the relevant aspects herein comprising the steps of first producing a catalyst according to any of the relevant aspects herein.

Definitions

The term "alkyl" when used herein, means, unless otherwise specified, $C_1$ to $C_{12}$ alkyl and includes methyl, ethyl, ethenyl, propyl, propenyl butyl, butenyl, pentyl, pentenyl, hexyl, hexenyl and heptyl groups, typically, the alkyl groups are selected from methyl, ethyl, propyl, butyl, pentyl and hexyl, more typically, methyl. Unless otherwise specified, alkyl groups may, when there is a sufficient number of carbon atoms, be linear or branched, be cyclic, acyclic or part cyclic/acyclic, be unsubstituted, substituted or terminated by one or more substituents selected from halo, cyano, nitro, —$OR^{19}$, —$OC(O)R^{20}$, —$C(O)R^{21}$, —$C(O)OR^{22}$, —$NR^{23}R^{24}$, —$C(O)NR^{25}R^{26}$, —$SR^{29}$, —$C(O)SR^{30}$, —$C(S)NR^{27}R^{28}$, unsubstituted or substituted aryl, or unsubstituted or substituted Het, wherein $R^{19}$ to $R^{30}$ here and generally herein each independently represent hydrogen, halo, unsubstituted or substituted aryl or unsubstituted or substituted alkyl, or, in the case of $R^{21}$, halo, nitro, cyano and amino and/or be interrupted by one or more (typically less than 4) oxygen, sulphur, silicon atoms, or by silano or dialkylsilcon groups, or mixtures thereof. Typically, the alkyl groups are unsubstituted, typically, linear and typically, saturated.

The term "alkenyl" should be understood as "alkyl" above except at least one carbon-carbon bond therein is unsaturated and accordingly the term relates to $C_2$ to $C_{12}$ alkenyl groups.

The term "alk" or the like should, in the absence of information to the contrary, be taken to be in accordance with the above definition of "alkyl" except "$C_0$ alk" means non-substituted with an alkyl.

The term "aryl" when used herein includes five-to-ten-membered, typically five to eight membered, carbocyclic aromatic or pseudo aromatic groups, such as phenyl, cyclopentadienyl and indenyl anions and naphthyl, which groups may be unsubstituted or substituted with one or more substituents selected from unsubstituted or substituted aryl, alkyl (which group may itself be unsubstituted or substituted or terminated as defined herein), Het (which group may itself be unsubstituted or substituted or terminated as defined herein), halo, cyano, nitro, $OR^{19}$, $OC(O)R^{20}$, $C(O)R^{21}$, $C(O)OR^{22}$, $NR^{23}R^{24}$, $C(O)NR^{25}R^{28}$, $SR^{29}$, $C(O)SR^{30}$ or $C(S)NR^{27}R^{28}$ wherein $R^{19}$ to $R^{30}$ each independently represent hydrogen, unsubstituted or substituted aryl or alkyl (which alkyl group may itself be unsubstituted or substituted or terminated as defined herein), or, in the case of $R^{21}$, halo, nitro, cyano or amino.

The term "halo" when used herein means a chloro, bromo, iodo or fluoro group, typically, chloro or fluoro.

The term "Het", when used herein, includes four- to twelve-membered, typically four- to ten-membered ring systems, which rings contain one or more heteroatoms selected from nitrogen, oxygen, sulfur and mixtures thereof, and which rings contain no, one or more double bonds or may be non-aromatic, partly aromatic or wholly aromatic in character. The ring systems may be monocyclic, bicyclic or fused. Each "Het" group identified herein may be unsubstituted or substituted by one or more substituents selected from halo, cyano, nitro, oxo, alkyl (which alkyl group may itself be unsubstituted or substituted or terminated as defined herein) —$OR^{19}$, —$OC(O)R^{20}$, —$C(O)R^{21}$, —$C(O)OR^{22}$, —$N(R^{23})R^{24}$, —$C(O)N(R^{25})R^{26}$, —$SR^{29}$, —$C(O)SR^{30}$ or —$C(S)N(R^{27})R^{28}$ wherein $R^{19}$ to $R^{30}$ each independently represent hydrogen, unsubstituted or substituted aryl or alkyl (which alkyl group itself may be unsubstituted or substituted or terminated as defined herein) or, in the case of $R^{21}$, halo, nitro, amino or cyano. The term "Het" thus includes groups such as optionally substituted azetidinyl, pyrrolidinyl, imidazolyl, indolyl, furanyl, oxazolyl, isoxazolyl, oxadiazolyl, thiazolyl, thiadiazolyl, triazolyl, oxatriazolyl, thiatriazolyl, pyridazinyl, morpholinyl, pyrimidinyl, pyrazinyl, quinolinyl, isoquinolinyl, piperidinyl, pyrazolyl and piperazinyl. Substitution at Het may be at a carbon atom of the Het ring or, where appropriate, at one or more of the heteroatoms.

"Het" groups may also be in the form of an N oxide.

Suitable optional alcohols for use in the catalysed reaction of the third and fourth aspects of the present invention may be selected from: a $C_1$-$C_{30}$ alkanol, including aryl alcohols, which may be optionally substituted with one or more substituents selected from alkyl, aryl, Het, halo, cyano, nitro, $OR^{19}$, $OC(O)R^{20}$, $C(O)R^{21}$, $C(O)OR^{22}$, $NR^{23}R^{24}$, $C(O)NR^{25}R^{28}$, $C(S)NR^{27}R^{28}$, $SR^{29}$ or $C(O)SR^{30}$ as defined herein. Highly preferred alkanols are $C_1$-$C_6$ alkanols such as methanol, ethanol, propanol, iso-propanol, iso-butanol, t-butyl alcohol, phenol, n-butanol and chlorocapryl alcohol, especially, methanol. Although the monoalkanols are most preferred, poly-alkanols, typically, selected from di-octa ols such as diols, triols, tetra-ols and sugars may also be utilised. Typically, such polyalkanols are selected from 1, 2-ethanediol, 1,3-propanediol, glycerol, 1,2,4 butanetriol, 2-(hydroxymethyl)-1,3-propanediol, 1,2,6 trihydroxyhexane, pentaerythritol, 1,1,1 tri(hydroxymethyl)ethane, nannose, sorbase, galactose and other sugars. Preferred sugars include sucrose, fructose and glucose.

Especially preferred alkanols are methanol and ethanol. The most preferred alkanol is methanol. The amount of alcohol is not critical. Generally, amounts are used in excess of the amount of substrate to be esterified. Thus, the alcohol may serve as the reaction solvent as well, although, if desired, separate or further solvents may also be used.

The term ageing is described in, for example, patent application WO 2009/003722. The general principles of ageing are described in The Chemistry of Silica: Solubility, Polymerisation, Colloid and Surface Properties and Biochemistry of Silica: by Ralph K Iler, 1979, John Wiley and Sons Inc., ISBN 0-471-02404-X, pages 358-364. If this stage is undertaken, the hydrogel is then washed again to remove any materials used in the ageing process and to bring the solution to the correct pH for addition of catalytically active metal which depends on the choice of salt for the catalytically active metal.

By the term "impregnated" as used herein is included the addition of the catalytic alkali metal dissolved in a solvent, to make a solution, which is added to the xerogel or aerogel, such that the solution is taken up into the voidages within the said xerogel or aerogel. The term also extends to replacing a hydrogel liquid with a suitable solvent and adding the catalytic alkali metal as a solution in the solvent to effect mass transfer into the hydrogel by diffusion.

The silica support may be treated by the mononuclear and/or dinuclear modifier metal by any of the various techniques known to those skilled in the art of support formation. The silica support may be contacted with the mononuclear or dinuclear modifier metal in such a manner so as to disperse modifier metal throughout the silica support. Typically, the modifier metal may be uniformly distributed throughout the surface of the silica support. Preferably, the modifier metal is dispersed through the silica support by adsorption.

By the term "adsorption" or the like in relation to the modifier metal or catalytic alkali metal as used herein is meant the incorporation of metal onto the silica support surface by the interaction of the metal cation source with the silica support, by chemisorption or physisorption, typically by chemisorption. Typically, addition of the modifier to the silica support involves the steps of: adsorption of the metal cation source onto the silica support to form an organic metal complex and drying or calcination of the complex to convert the organic metal complexes to metal oxide moieties. Typically, there is therefore a random distribution of modifier or catalytic alkali metal throughout the silica support.

Modifier metal and modifier metal oxide moieties in the modified silica support according to the present invention relate to modifier metal, not to silicon or silica. Similarly, the modifier metal herein is not the same metal as the catalytic alkali metal.

Unless indicated to the contrary, amounts of modifier or catalytic alkali metal or modifier or catalytic alkali metal in the catalyst relate to the modifier or catalytic alkali metal ion and not the surrounding atoms.

The term "gel" as used herein is also known to the skilled person but in case of doubt may be taken to be a solid network in which a fluid is dispersed. Generally, the gel is a polymer network in which fluid is dispersed. A co-gel is a term used to indicate that more than one original chemical compound/moiety is incorporated into the polymeric network, usually silica and a metal oxide or salt such as zirconia. Accordingly, co-gelation herein means the formation of a co-gel.

A gel is thus a sol that has set. A Hydrogel is thus a gel as defined herein where the fluid is water. A Xerogel is a gel that has been dried to remove the fluid. An Aerogel is a gel in which the fluid is replaced by a gas and therefore is not subject to the same shrinkage as a Xerogel.

The term commencement herein means the beginning of the formation of the modified silica.

The term "moieties" as used herein in relation to the metal is used to refer to the form of the modifier metal on the modified support. Although, the modifier metal generally forms part of a network, the modifier metal will be in the form of discrete residues on the silica substrate. The term mononuclear means having a single metal centre and in the case of moieties on the silica means having the form of a mononuclear residue and dinuclear should be interpreted accordingly.

It will be appreciated that in a silica network the modifier metal moieties are associated with the silica network and therefore the term mono- or dinuclear moiety is a reference to the modifier metal and its immediately surrounding atoms and not to the silicon atoms of the network or to other modifier metal atoms associated with the network but nevertheless forming part of separate generally unassociated moieties.

% of the modifier metal has no units herein because it refers to number of metal atoms per total number of such atoms. It will be appreciated that the moieties may take the form of non-mono or dinuclear clusters but that these clusters are still made up of modifier metal atoms.

The term "surface" as used herein in relation to the silica support, unless stated otherwise, includes the surface of the silica within the pores of the silica, more particularly, within the macro- and mesopores thereof.

Embodiments of the invention will now be defined by reference to the accompanying examples and figures in which:

FIG. 1 shows the results of Mercury porosimetry for selected examples:

FIG. 2 shows the results of $N_2$ adsorption for selected examples;

FIG. 3 shows the results of Mercury porosimetry for selected examples; and

FIG. 4 shows the results of $N_2$ adsorption for selected examples.

EXPERIMENTAL $N_2$ Adsorption

Catalysts from Example 1 to Example 4 were measured for their mesopore size distribution in mesopore range, 5 to 50 nm, by $N_2$ adsorption, MICROMERITICS INSTRUMENT CORPORATION TriStar II 3020. 0.1-0.2 g of sample was loaded into a dedicated sample cell. The cell was heated to 380° C. under air flow and this preconditioning was carried out for two hours at least. After preconditioning, the sample was weighed and the equipment set up to carry out the surface area determination. $N_2$ adsorption of the sample was carried out at −196° C. to obtain adsorption-desorption isotherms. The BET surface area and the BJH mesopore size distribution were calculated from their isotherms.

Mercury Porosimetry

Catalysts from Example 1 to Example 4 were measured for their macropore size distribution in the macropore range, over 50 nm, by Mercury porosimetry, using a MICROMERITICS INSTRUMENT CORPORATION Autopore IV 9500 instrument. 0.3-1 g of dried sample was loaded into a dedicated sample cell. The cell was loaded into the equipment. Mercury (Hg) was inserted into the catalyst pores in the sample by varying the pressure to obtain the macropore size distribution.

Silica Support Description

Example 1 (Preparative) (Silica without Macropore)

Silica gel samples were prepared using a commercially available water glass, Sodium silicate solution EMD Millipore Corporation, containing 25.5 to 28.5 wt % $SiO_2$ and 7.5 to 8.5 wt % $Na_2O$, as a silica source.

69 g of distilled water and 53 g of Nitric acid (65% $HNO_3$, Sigma Aldrich), were placed into a plastic flask, to form Solution 1. 80 g of water glass and 73 g of distilled water were placed in a separate flask, to form Solution 2. These two solutions were then mixed, with stirring. This mixed solution was kept at room temperature for 10 to 60 minutes. The solution underwent gelation and was changed to a silica hydrogel. The silica hydrogel was washed by distilled water several times. The silica hydrogel was then aged by contact with a basic solution (0.1M $NH_3$ solution), in a temperature controlled oil bath at 50° C. for 24 hours. After the ageing process, the silica hydrogel was dried at 50° C., and then calcined at 600° C. in a tubular furnace under a flow of air (1 l/min) for 3 hours. After the calcination process, silica support was sieved to the 1 to 4 mm fraction. After sieving, a silica support without macropores was obtained.

Example 2 (Preparative) (Silica with 0.13 μm Macropore Diameter)

Silica was prepared as described in Example 1 except that 10 g of polyacrylic acid (Polyacrylic Acid Mw=25000 from Wako Pure Chemicals Corporation), was added to Solution 1, and 66 g of 65% nitric acid was used. The macropore diameter in the resulting processed silica was obtained by Hg porosimetry.

Example 3 (Preparative) (Silica with 0.20 μm Macropore Diameter)

Silica was prepared as described in Example 1 except that 10 g of polyacrylic acid was added to Solution 1, and 65 g of 65% nitric acid was used. The macropore diameter in the resulting processed silica was obtained by Hg porosimetry.

Example 4 (Preparative) (Silica with 0.88 μm Macropore Diameter)

Silica was prepared as described in Example 1 except that 9.5 g of polyacrylic acid was added to Solution 1 and 59 g of 65% nitric acid was used. The macropore diameter in the resulting processed silica was obtained by Hg porosimetry.
Zr Modification of Silica Supports Example 5 (Preparative) (2.2 wt % Zr, without Macropore)

1.57 g of $Zr(acac)_4$ (97% Zirconium acetylacetonate, Sigma Aldrich) was dissolved in 25 ml of Methanol (99.9% anhydrous, Sigma Aldrich). In a separate flask, 11.3 g of the silica from Example 1 was weighed. The weighed silica was then added to the Zr-complex solution. The Zr-modified silica was left for 24 hours in a sealed flask. This was followed by a drying step at room temperature. Once all of the solvent had been removed the Zr-modified silica support was calcined in a tubular furnace at 500° C. under a flow of air (1 l/min) with a heating ramp rate of 5° C./min and a final hold of 5 hours. The Zr load (wt %) on the Zr-modified support was determined by either ion coupled plasma mass spectrometry (ICPMS) or ion coupled plasma atomic emission spectroscopy (ICPAES) analysis.

Example 6 (Preparative) (2.2 wt % Zr, with 0.13 μm Macropore Diameter)

A support modification as described in Example 5 was performed except that the silica from Example 2 was used. Additionally, 50 ml of methanol was used instead of 25 ml.

Example 7 (Preparative) (2.2 wt % Zr, with 0.20 μm Macropore Diameter)

A support modification as described in Example 5 was performed except that the silica from Example 3 was used. Additionally, 50 ml of methanol was used instead of 25 ml.

Example 8 (Preparative) (2.2 wt % Zr, with 0.88 μm Macropore Diameter)

A support modification as described in Example 5 was performed except that the silica from Example 4 was used. Additionally, 50 ml of methanol was used instead of 25 ml.
Cs Modification of Modified Supports Example 9 (Comparative) (7.7 wt % Cs, 2.2 wt % Zr, without Macropore)

0.329 g of $CsOH \cdot H_2O$ (99.5% Sigma Aldrich) was weighed out in a glovebox and dissolved in 20 ml MeOH (99.9% anhydrous MeOH from Sigma Aldrich) solvent. 3.1 g of the modified silica from Example 5 was added to the CsOH solution. The sample was left for 24 hours in a sealed flask. This was followed by a drying step at room temperature. Following this step, the catalyst granules were placed into a drying oven at 110-120° C. and left to dry for 16 hours.

Example 10 (Comparative) (9.6 wt % Cs, 2.2 wt % Zr, without Macropore)

A catalyst was prepared as described in Example 9 except that 0.419 g of $CsOH \cdot H_2O$ was used.

Example 11 (Comparative) (11.4 wt % Cs, 2.2 wt % Zr, without Macropore)

A catalyst was prepared as described in Example 9 except that 0.509 g of $CsOH \cdot H_2O$ was used.

Example 12 (7.7 wt % Cs, 2.2 wt % Zr, with 0.13 μm Macropore Diameter)

A catalyst was prepared as described in Example 9 except that modified silica from Example 6 was used.

Example 13 (9.6 wt % Cs, 2.2 wt % Zr, with 0.13 μm Macropore Diameter)

A catalyst was prepared as described in Example 9 except that 0.419 g of $CsOH \cdot H_2O$ was used and modified silica from Example 6 was used.

Example 14 (11.4 wt % Cs, 2.2 wt % Zr, with 0.13 μm Macropore Diameter)

A catalyst was prepared as described in Example 9 except that 0.509 g of $CsOH \cdot H_2O$ was used and modified silica from Example 6 was used.

Example 15 (7.7 wt % Cs, 2.2 wt % Zr, with 0.20 μm Macropore Diameter)

A catalyst was prepared as described in Example 9 except that modified silica from Example 7 was used.

Example 16 (9.6 wt % Cs, 2.2 wt % Zr, with 0.20 μm Macropore Diameter)

A catalyst was prepared as described in Example 9 except that 0.419 g of $CsOH \cdot H_2O$ was used and modified silica from Example 7 was used.

Example 17 (11.4 wt % Cs, 2.2 wt % Zr, with 0.20 μm Macropore Diameter)

A catalyst was prepared as described in Example 9 except that 0.509 g of $CsOH \cdot H_2O$ was used and modified silica from Example 7 was used.

Example 18 (7.7 wt % Cs, 2.2 wt % Zr, with 0.88 μm Macropore Diameter)

A catalyst was prepared as described in Example 9 except that modified silica from Example 8 was used.

Example 19 (9.6 wt % Cs, 2.2 wt % Zr, with 0.88 µm Macropore Diameter)

A catalyst was prepared as described in Example 9 except that 0.419 g of CsOH·H₂O was used and modified silica from Example 8 was used.

Example 20 (11.4 wt % Cs, 2.2 wt % Zr, with 0.88 µm Macropore Diameter)

A catalyst was prepared as described in Example 9 except that 0.509 g of CsOH·H₂O was used and modified silica from Example 8 was used.

Silica-Zirconia Support Description (Co-Gel)

Example 21 (Preparative) (Silica-Zirconia without Macropore)

2.16 g of Zirconium oxynitrate hydrate (Sigma Aldrich) was dissolved in 69 g of distilled water and 59 g of Nitric acid (65% HNO₃ Sigma Aldrich) in a plastic flask, to form Solution 1. 80 g of water glass and 73 g of distilled water were mixed in a separate flask, to form Solution 2. These two solutions were then mixed with stirring. This mixed solution was kept at room temperature for 10 to 60 minutes. The solution underwent gelation and changed to a silica-zirconia hydrogel (co-gel). The silica hydrogel was washed by distilled water several times. The silica-zirconia hydrogel was then aged by contact with a basic solution (1M NH₃ solution), in a temperature controlled oil bath at 70° C. After the ageing process, the silica-zirconia hydrogel was dried at 50° C. and calcined at 600° C. in a tubular furnace under a flow of air (1 l/min) for 3 hours. After the calcination process, the silica-zirconia support was sieved 1 to 4 mm. After sieving, a silica-zirconia support without macropores was obtained.

Example 22 (Preparative) (Silica-Zirconia with 0.42 µm Macropore Diameter)

Silica-Zirconia was prepared as described in Example 21 except that 10 g of polyacrylic acid (Polyacrylic Acid Mw=25000 Wako Pure Chemicals Corporation), was added to Solution 1, and 64 g of 65% nitric acid was used. The macropore diameter was obtained by Hg porosimetry.

Example 23 (Preparative) (Silica-Zirconia with 0.61 µm Macropore Diameter)

Silica-Zirconia was prepared as described in Example 21 except that 9.5 g of polyacrylic acid (Polyacrylic Acid Mw=25000 Wako Pure Chemicals Corporation), was added to Solution 1 and 53 g of 65% nitric acid was used. The macropore diameter was obtained by Hg porosimetry.

Cs Modification of Silica-Zirconia Supports

Example 24 (Comparative) (8.0 wt % Cs, 2.4 wt % Zr, without Macropore)

0.341 g of CsOH·H₂O (99.5% Sigma Aldrich) was weighed out in a glovebox and dissolved in 20 ml MeOH (99.9% anhydrous MeOH from Sigma Aldrich) solvent. 3.1 g of the Silica-Zirconia support from Example 21 was added to the CsOH solution. The sample was left for 24 hours in a sealed flask. This was followed by a drying step at room temperature. Following this step, the catalyst granules were placed into a drying oven at 110-120° C. and left to dry for 16 hours.

Example 25 (Comparative) (9.5 wt % Cs, 2.4 wt % Zr, without Macropore)

A catalyst was prepared as described in Example 24 except that 0.411 g of CsOH·H₂O was used.

Example 26 (Comparative) (11 wt % Cs, 2.4 wt % Zr, without Macropore)

A catalyst was prepared as described in Example 24 except that 0.484 g of CsOH·H₂O was used.

Example 27 (8.0 wt % Cs, 2.4 wt % Zr, with 0.42 µm Macropore Diameter)

A catalyst was prepared as described in Example 24 except that Silica-Zirconia from Example 22 was used.

Example 28 (9.5 wt % Cs, 2.4 wt % Zr, with 0.42 µm Macropore Diameter)

A catalyst was prepared as described in Example 24 except that 0.411 g of CsOH·H₂O was used and Silica-Zirconia from Example 22 was used.

Example 29 (11 wt % Cs, 2.4 wt % Zr, with 0.42 µm Macropore Diameter)

A catalyst was prepared as described in Example 24 except that 0.484 g of CsOH·H₂O was used and Silica-Zirconia from Example 22 was used.

Example 30 (8.0 wt % Cs, 2.4 wt % Zr, with 0.61 µm Macropore Diameter)

A catalyst was prepared as described in Example 24 except that Silica-Zirconia from Example 23 was used.

Example 31 (9.5 wt % Cs, 2.4 wt % Zr, with 0.61 µm Macropore Diameter)

A catalyst was prepared as described in Example 24 except that 0.411 g of CsOH·H₂O was used and Silica-Zirconia from Example 23 was used.

Example 32 (11 wt % Cs, 2.4 wt % Zr, with 0.61 µm Macropore Diameter)

A catalyst was prepared as described in Example 24 except that 0.484 g of CsOH·H₂O was used and Silica-Zirconia from Example 23 was used.

Example 33 (Catalytic Performance Testing)

Catalysts from Examples 9 to 20 and Examples 24 to 32 were tested for the reaction of methyl propionate and formaldehyde in a labscale microreactor. For this, 3 g of catalyst was loaded into a fixed bed reactor with an internal tube diameter of 18 mm. The reactor was heated to 350° C. and preconditioning was performed by feeding a vaporised stream comprising of 70 wt % methyl propionate, 20 wt % methanol, 6 wt % water and 4 wt % formaldehyde from a vaporiser fed by a Gilson pump at 0.032 ml/min. This preconditioning was continued overnight. After preconditioning, a feed stream comprising of 75.6 wt % methyl propionate, 18.1 wt % methanol, 5.7 wt % formaldehyde and 0.6 wt % water, was pumped by a Gilson pump to a vaporiser set at 350° C. before being fed to the heated reactor set at 350° C. containing the catalyst. The reactor exit vapour was cooled and condensed with samples being collected at five different liquid feed rates (between 0.64-0.032 m/min) so as to obtain conversions at varying vapour/catalyst contact times. The liquid feed and condensed ex-reactor liquid products were analysed by a Shimadzu 2010 Gas Chromatograph with a DB1701 column. The compositions of the samples were determined from the respective chromatograms and yields and selectivities at varying contact times determined. Activity was defined as the inverse of the contact time, in seconds, required to obtain 10% MMA+MAA yield on methyl propionate fed and was determined via an interpolation on a contact time vs. MMA+MAA yield graph.

This interpolated contact time was then used to obtain the MMA+MAA selectivity at 10% MMA+MAA yield.

Catalytic performance data for the aforementioned examples, along with composition and porosity data, is summarised below in Tables 1 and 2.

Pore size distribution data for the macroporous silica (Examples 1 to 4) and macroporous silica-zirconia supports (Examples 21 to 23) are shown in FIGS. 1 to 4. FIGS. 1 and 3 are macropore size distributions obtained by mercury porosimetry, and FIGS. 2 and 4 are mesopore size distributions obtained by $N_2$ adsorption BJH analysis.

TABLE 1

Composition, Porosity, MMA + MAA and Heavies Selectivity Data for Catalysts Derived from Mesoporous and Mesoporous-Macroporous Silica Supports.

| Example | Zr load (wt %) | Cs load (wt %) | Mesopore volume (cm³/g) | Macropore volume (cm³/g) | Macropore diameter (μm) | MMA + MAA selectivity (%) | Heavies selectivity (%) |
|---|---|---|---|---|---|---|---|
| Example 9 | 2.2 | 7.7 | 0.82 | — | — | 97.0 | 1.67 |
| Example 10 | 2.2 | 9.6 | 0.82 | — | — | 95.8 | 3.17 |
| Example 11 | 2.2 | 11.4 | 0.82 | — | — | 95.0 | 3.84 |
| Example 12 | 2.2 | 7.7 | 1.30 | 0.97 | 0.13 | 97.3 | 1.03 |
| Example 13 | 2.2 | 9.6 | 1.30 | 0.97 | 0.13 | 97.1 | 1.63 |
| Example 14 | 2.2 | 11.4 | 1.30 | 0.97 | 0.13 | 96.5 | 2.09 |
| Example 15 | 2.2 | 7.7 | 1.26 | 1.31 | 0.20 | 97.3 | 1.09 |
| Example 16 | 2.2 | 9.6 | 1.26 | 1.31 | 0.20 | 97.4 | 1.44 |
| Example 17 | 2.2 | 11.4 | 1.26 | 1.31 | 0.20 | 97.1 | 1.89 |
| Example 18 | 2.2 | 7.7 | 1.24 | 1.98 | 0.88 | 96.7 | 1.28 |
| Example 19 | 2.2 | 9.6 | 1.24 | 1.98 | 0.88 | 97.4 | 1.45 |
| Example 20 | 2.2 | 11.4 | 1.24 | 1.98 | 0.88 | 97.1 | 1.89 |

TABLE 2

Composition, Porosity, MMA + MAA and Heavies Selectivity Data for Catalysts Derived from Mesoporous and Mesoporous-Macroporous Silica-Zirconia Supports (Co-gel).

| Example | Zr load (wt %) | Cs load (wt %) | Mesopore volume (cm³/g) | Macropore volume (cm³/g) | Macropore diameter (μm) | MMA + MAA selectivity (%) | Heavies selectivity (%) |
|---|---|---|---|---|---|---|---|
| Example 24 | 2.4 | 8.0 | 0.76 | — | — | 95.5 | 2.94 |
| Example 25 | 2.4 | 9.5 | 0.76 | — | — | 95.9 | 2.97 |
| Example 26 | 2.4 | 11.0 | 0.76 | — | — | 94.9 | 3.86 |
| Example 27 | 2.4 | 8.0 | 0.79 | 1.20 | 0.42 | 96.2 | 1.27 |
| Example 28 | 2.4 | 9.5 | 0.79 | 1.20 | 0.42 | 96.9 | 1.69 |
| Example 29 | 2.4 | 11.0 | 0.79 | 1.20 | 0.42 | 96.8 | 2.02 |
| Example 30 | 2.4 | 8.0 | 0.78 | 1.26 | 0.61 | 95.6 | 1.36 |
| Example 31 | 2.4 | 9.5 | 0.78 | 1.26 | 0.61 | 96.5 | 1.73 |
| Example 32 | 2.4 | 11.0 | 0.78 | 1.26 | 0.61 | 96.7 | 1.82 |

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the preferred, typical or optional invention features disclosed in this specification (including any accompanying claims, abstract or drawings), or to any novel one, or any novel combination, of the preferred, typical or optional invention steps of any method or process so disclosed

The invention claimed is:

1. A catalyst comprising:
    a silica support, a modifier metal and a catalytic alkali metal,
    wherein the silica support has a multimodal pore size distribution comprising:
        a) a mesoporous pore size distribution having an average pore size in the range 2 to 50 nm and a pore volume of said mesopores of at least 0.1 cm$^3$/g; and
        b) a macroporous pore size distribution having an average pore size of more than 50 nm and a pore volume of said macropores of at least 0.1 cm$^3$/g,
        wherein the amount of catalytic alkali metal supported on the silica support is at least 2 mol %,
    and wherein the modifier metal is selected from a group consisting of Mg, B, Al, Ti, Zr and Hf.

2. A catalyst according to claim 1, wherein the amount of catalytic alkali metal on the silica support is at least 3 mol % and up to 10 mol %.

3. A catalyst according to claim 1, wherein the amount of silica in the support is at least 50 wt %.

4. A catalyst according to claim 1, wherein the average mesopore volume of the catalyst is in the range of 0.2-3 cm$^3$/g as measured by uptake of nitrogen.

5. A catalyst according to claim 1, wherein the average macropore volume of the catalyst is in the range of 0.1-3 cm$^3$/g as measured by uptake of mercury.

6. A catalyst according to claim 1, wherein the macropore:mesopore volume ratio of the catalyst is in the range of 0.03-15.

7. A catalyst according to claim 1, wherein the catalyst is substantially free of a compound selected from the group consisting of tungsten, antimony, vanadium, bismuth, a metal of Group 3, a metal of Group 10, a metal of Group 13, a metal of Group 14, and a combination thereof.

8. A catalyst according to claim 1, wherein the modifier metal is an adsorbate adsorbed on the silica support surface.

9. A catalyst according to claim 1, wherein the modifier metal is present as modifier metal oxide moieties.

10. A catalyst according to claim 1, wherein the silica support is in the form of a silica gel.

11. A catalyst according to claim 10, wherein the modifier metal is present in the silica support in the form of a co-gel.

12. A catalyst according to claim 1, wherein the amount of modifier metal present is up to $7.6 \times 10^{-2}$ mol/mol of silica.

13. A catalyst according to claim 1, wherein the level amount of modifier metal is between $0.067 \times 10^{-2}$ and $7.3 \times 10^{-2}$ mol/mol of silica.

14. A catalyst according to claim 1, wherein the level amount of modifier metal present is at least $0.1 \times 10^{-2}$ mol/mol of silica.

15. A catalyst according to claim 1, wherein the silica support is a calcined silica support.

16. A catalyst according to claim 1, wherein the catalytic alkali metal is one or more alkali metals selected from the group consisting of potassium, rubidium and caesium.

17. A catalyst according to claim 1, wherein catalytic alkali metal is present in the range 0.5-7.0 mol/mol modifier metal.

18. A catalyst according to claim 1, wherein the catalytic alkali metal:modifier metal mole ratio is in the range 1.4 to 5:1.

19. A catalyst according to claim 1, wherein the average surface area is in the range 20-1000 m$^2$/g.

20. A catalyst according to claim 1, wherein the total metal content of the catalyst is at least 80 wt % of the catalytic alkali metal and the modifier metal.

* * * * *